(12) United States Patent
Schmidt et al.

(10) Patent No.: US 12,044,623 B2
(45) Date of Patent: Jul. 23, 2024

(54) OPTOFLUIDIC ANALYTE DETECTION SYSTEMS USING MULTI-MODE INTERFERENCE WAVEGUIDES

(71) Applicants: The Regents of the University of California, Oakland, CA (US); Brigham Young University, Provo, UT (US)

(72) Inventors: Holger Schmidt, Capitola, CA (US); Aaron Roe Hawkins, Provo, UT (US); Joshua Wayne Parks, Santa Cruz, CA (US)

(73) Assignees: The Regents of the University of California, Oakland, CA (US); Brigham Young University, Provo, UT (US)

( * ) Notice: Subject to any disclaimer, the term of this patent is extended or adjusted under 35 U.S.C. 154(b) by 120 days.

(21) Appl. No.: 17/584,469

(22) Filed: Jan. 26, 2022

(65) Prior Publication Data
US 2022/0205912 A1 Jun. 30, 2022

Related U.S. Application Data

(63) Continuation of application No. 16/489,545, filed as application No. PCT/US2018/020023 on Feb. 27, 2018, now abandoned.
(Continued)

(51) Int. Cl.
*G01N 21/64* (2006.01)
*B01L 3/00* (2006.01)
(Continued)

(52) U.S. Cl.
CPC ...... *G01N 21/645* (2013.01); *B01L 3/502715* (2013.01); *G02B 6/12007* (2013.01);
(Continued)

(58) Field of Classification Search
None
See application file for complete search history.

(56) References Cited

U.S. PATENT DOCUMENTS 4,002,998 A 1/1977 Conwell et al.
4,324,492 A 4/1982 Drenckhan et al.
(Continued)

FOREIGN PATENT DOCUMENTS

CN 1488763 A 4/2004
CN 101271070 A 9/2008
(Continued)

OTHER PUBLICATIONS

Ozcelik, D., "Optofluidic Devices for Biomolecule Sensing and Multiplexing", Dec. 1, 2016 (Dec. 1, 2016), XP055739954, retrieved from the Internet: URL:https://escholarship.org/content/qtlbw3g52s/qtlbw3g52s.pdf?t=ojk7y9, [retrieved on Oct. 14, 2020] *abstract; sections 2.3, 5.2.2, 5.4 and 7.5; figures 2.3, 5.29, 5.30 and 5.31 *.
(Continued)

*Primary Examiner* — Samuel P Siefke
*Assistant Examiner* — Henry H Nguyen
(74) *Attorney, Agent, or Firm* — Carter, DeLuca & Farrell LLP

(57) ABSTRACT

Systems, methods, and techniques for optofluidic analyte detection and analysis using multi-mode interference (MMI) waveguides are disclosed herein. In some embodiments, spatially and spectrally multiplexed optical detection of particles is implemented on an optofluidic platform comprising multiple analyte channels intersecting a single MMI waveguide. In some embodiments, multi-stage photonic structures including a first stage MMI waveguide for demultiplexing optical signals by spatially separating different wavelengths of light from one another may be implemented. In some embodiments, a second stage may use single-mode
(Continued)

waveguides and/or MMI waveguides to create multi-spot patterns using the demultiplexed, spatially separated light output from the first stage. In some embodiments, liquid-core MMI (LC-MMI) waveguides that are tunable by replacing a liquid core, heating/cooling the liquid core, and/or deforming the LC-MMI to change its width may be implemented in one or more of the analyte detection/analysis systems disclosed herein.

11 Claims, 30 Drawing Sheets

Related U.S. Application Data

(60) Provisional application No. 62/465,005, filed on Feb. 28, 2017, provisional application No. 62/465,008, filed on Feb. 28, 2017, provisional application No. 62/465,022, filed on Feb. 28, 2017, provisional application No. 62/465,013, filed on Feb. 28, 2017.

(51) Int. Cl.
 G02B 6/12     (2006.01)
 G02B 6/28     (2006.01)
 G02F 1/21     (2006.01)

(52) U.S. Cl.
 CPC .......... G02F 1/217 (2021.01); B01L 2200/10 (2013.01); B01L 2300/0654 (2013.01); B01L 2300/0663 (2013.01); B01L 2300/0816 (2013.01); G01N 2021/6417 (2013.01); G01N 2021/6419 (2013.01); G01N 2021/6484 (2013.01); G01N 2201/0635 (2013.01); G01N 2201/088 (2013.01); G02B 6/2813 (2013.01)

(56) References Cited

U.S. PATENT DOCUMENTS

| | | | |
|---|---|---|---|
| 5,852,691 A * | 12/1998 | Mackie | G02B 6/126 385/47 |
| 6,020,207 A | 2/2000 | Liu | |
| 6,141,367 A | 10/2000 | Fan et al. | |
| 6,192,168 B1 | 2/2001 | Feldstein et al. | |
| 6,198,869 B1 | 3/2001 | Kraus et al. | |
| 6,337,740 B1 | 1/2002 | Parce | |
| 6,771,847 B2 | 8/2004 | Mukai | |
| 6,808,075 B2 | 10/2004 | Bohm et al. | |
| 6,899,849 B2 | 5/2005 | Meinhart et al. | |
| 7,040,338 B2 | 5/2006 | Unger et al. | |
| 7,129,048 B2 | 10/2006 | Bruchez et al. | |
| 7,149,396 B2 | 12/2006 | Schmidt et al. | |
| 7,175,811 B2 | 2/2007 | Bach et al. | |
| 7,211,444 B2 | 5/2007 | Fagan | |
| 7,251,026 B2 | 7/2007 | Gilby | |
| 7,306,672 B2 | 12/2007 | Hansen et al. | |
| 7,384,923 B2 | 6/2008 | Gregoriadis | |
| 7,385,460 B1 | 6/2008 | Wang et al. | |
| 7,391,949 B2 | 6/2008 | Schmidt et al. | |
| 7,497,997 B2 | 3/2009 | Glezer et al. | |
| 7,574,076 B2 | 8/2009 | Mueth et al. | |
| 7,731,826 B2 | 6/2010 | Hibbs et al. | |
| 7,746,466 B2 | 6/2010 | Godin et al. | |
| 7,830,926 B1 | 11/2010 | Kim | |
| 7,995,890 B2 | 8/2011 | Schmidt et al. | |
| 8,005,332 B2 | 8/2011 | Schmidt et al. | |
| 8,270,781 B2 * | 9/2012 | Lo | G01N 21/49 422/82.11 |
| 8,279,445 B2 | 10/2012 | Dominguez Horna et al. | |
| 8,538,207 B2 | 9/2013 | Gates et al. | |
| 8,552,363 B2 | 10/2013 | Erickson et al. | |
| 8,792,103 B2 | 7/2014 | Ymeti et al. | |
| 8,859,267 B2 | 10/2014 | Seyama et al. | |
| 8,986,928 B2 | 3/2015 | Turner et al. | |
| 9,134,221 B2 | 9/2015 | Lo et al. | |
| 9,164,024 B2 | 10/2015 | Schmidt et al. | |
| 9,176,072 B2 | 11/2015 | Zhao et al. | |
| 9,222,885 B2 | 12/2015 | Sacko et al. | |
| 9,267,891 B2 | 2/2016 | Schmidt et al. | |
| 9,515,159 B2 | 12/2016 | Bischopink et al. | |
| 9,535,003 B2 | 1/2017 | Nishio et al. | |
| 9,551,667 B2 | 1/2017 | Schmidt et al. | |
| 9,566,558 B2 | 2/2017 | Viovy et al. | |
| 9,983,191 B2 | 5/2018 | Morin | |
| 10,222,318 B2 | 3/2019 | Faez et al. | |
| 10,281,389 B2 | 5/2019 | Weidlich et al. | |
| 10,670,590 B2 | 6/2020 | Morin et al. | |
| 10,816,550 B2 | 10/2020 | Cho et al. | |
| 10,875,020 B2 | 12/2020 | Schmidt | |
| 11,204,348 B2 | 12/2021 | Shin | |
| 11,303,089 B2 | 4/2022 | Schmidt | |
| 11,549,881 B2 | 1/2023 | Schmidt | |
| 11,717,828 B2 | 8/2023 | Schmidt et al. | |
| 2005/0046834 A1 * | 3/2005 | Gilby | G01N 21/05 356/246 |
| 2005/0142565 A1 | 6/2005 | Samper et al. | |
| 2006/0171654 A1 | 8/2006 | Hawkins et al. | |
| 2006/0171846 A1 | 8/2006 | Marr et al. | |
| 2006/0177350 A1 | 8/2006 | Sano et al. | |
| 2006/0194206 A1 | 8/2006 | Persson et al. | |
| 2006/0231419 A1 | 10/2006 | Barth et al. | |
| 2008/0057594 A1 | 3/2008 | Fagan | |
| 2008/0254995 A1 | 10/2008 | Kim et al. | |
| 2009/0165876 A1 | 7/2009 | Atkin et al. | |
| 2010/0051788 A1 | 3/2010 | Klunder et al. | |
| 2012/0040470 A1 | 2/2012 | Dorn et al. | |
| 2012/0214707 A1 | 8/2012 | Ymeti et al. | |
| 2012/0312083 A1 | 12/2012 | Akahori et al. | |
| 2016/0246009 A1 * | 8/2016 | Jiang | G02B 6/124 |
| 2020/0011795 A1 | 1/2020 | Schmidt et al. | |
| 2020/0284783 A1 | 9/2020 | Schmidt et al. | |

FOREIGN PATENT DOCUMENTS

| | | | |
|---|---|---|---|
| DE | 102013015016 A1 | 9/2014 | |
| EP | 0393196 A1 | 10/1990 | |
| EP | 0414430 A1 | 2/1991 | |
| JP | H0727927 A | 1/1995 | |
| JP | 2521618 B2 | 8/1996 | |
| JP | 2958060 B2 | 10/1999 | |
| JP | 2004077305 A | 3/2004 | |
| JP | 2005141009 A | 6/2005 | |
| JP | 2009063601 A | 3/2009 | |
| WO | WO-02099472 A2 * | 12/2002 | ........... G02B 6/2813 |
| WO | 2004040319 A1 | 5/2004 | |
| WO | 2006064465 A2 | 6/2006 | |
| WO | 2010/045357 A2 | 4/2010 | |
| WO | 2012170352 A2 | 12/2012 | |
| WO | 2013058084 A1 | 4/2013 | |
| WO | WO-2016123719 A1 * | 8/2016 | |

OTHER PUBLICATIONS

Ozcelik, D., et al., "Spatially Multiplexed Bioparticle Detection Using Multimode Interference", Jun. 5, 2016 (Jun. 5, 2016), 2016 Conference on Lasers and Electro-Optics (CLEO), OSA, pp. 1-2, XP033025538, [retrieved on Dec. 16, 2016] *the whole document*.
Ozcelik, D., et al., "Signal-to-Noise Enhancement in Optical Detection of Single Viruses With Multispot Excitation", IEEE Journal of Selected Topics in Quantum Electronics, IEEE Service Center, Piscataway, NJ, US, vol. 22, No. 4, Jul. 1, 2016 (Jul. 1, 2016), pp. 1-6, XP011603989, ISSN: 1077-260X, DOI: 10.1109/JSTQE.2015. 2503321 [retrieved on Nov. 24, 2015] * abstact; figure 1 *.
Parks, Joshua W., et al., "Flexible Optofluidic Waveguide Platform with Multi-Dimensional Reconfigurability", Scientific Reports, vol. 6, No. 1, Sep. 6, 2016 (Sep. 6, 2016), XP055481961, DOI: 10.1038/srep33008 * abstract; figure 3.1 and the corresponding description *.
European Examination Report dated Mar. 11, 2021 issued in corresponding EP Appln. No. 18710671.1.

(56) References Cited

OTHER PUBLICATIONS

Ozcelik et al.; "Signal-to-noise Enhancement in Optical Detection of Single Viruses with Multi-Spot Excitation"; IEEE Journal of Selected Topics in Quantum Electronics; vol. 22; 2016; 14 pages.
Balslev et al.; "Lab-on-a-Chip With Integrated Optical Transducers"; Lab on a Chip; vol. 6; 2006; p. 213-217.
Clearly et al.; "An Integrated Fluorescence Array as a Platform for Lab-on-a-Chip Technology Using Multimode Interference Splitters"; IEEE Sensors Journal; vol. 5; Dec. 2005; p. 1315-1320 (abstract only).
Ozcelik et al.; "Optofluidic Wavelength Division Multiplexing for Single-Virus Detection"; PNAS; vol. 112; Oct. 2015; p. 12933-12937.
International Patent Application No. PCT/US2018/020023; Int'l Written Opinion and Search Report; dated Aug. 29, 2018; 20 pages.
Xiao et al., "Design of an Ultracompact MMI Wavelength Demultiplexer in Slot Waveguide Structures", 2007, Optics Express, vol. 15, No. 13, (Year: 2007).
Yao et al., An Ultracompact Multi Mode Interference Wavelength Splitter Employing Asymmetrical Multi-Section Structures, 2012, Optics Express, vol. 20, No. 16, (Year: 2012).
Ma et al., "Design and Optimization of a Novel Silicon-on-Insulator Wavelength Diplexer", 2014, Optics Express, vol. 22, No. 22, (Year: 2014).
Wei et al., "A Novel Wavelength Multiplexer/Demutiplexer Based on Side-Port Multimode Interference Coupler", 2014, Silicon Photonics and Photonic Integrated Circuits IV, vol. 9133, (Year: 2014).
Cleary, et al., "An Integrated Fluorescence Array as a Platform for Lab-on-a-Chip Technology Using Multi Mode Interference Splitters"; IEEE Sensors Journal; vol. 5; Dec. 2005; p. 1315-1320. (whole document) (Year: 2005).
Notification of Reasons for Refusal dated Mar. 7, 2022 issued in corresponding JP Appln. No. 2019-547098.
Japanese Office Action issued in corresponding application JP 2019-547098 mailed Dec. 6, 2022, together with English language translation (6 pages).
European Examination Report issued in corrresponding application EP 18 710 671.1 dated Dec. 21, 2022 (4 pages).

* cited by examiner

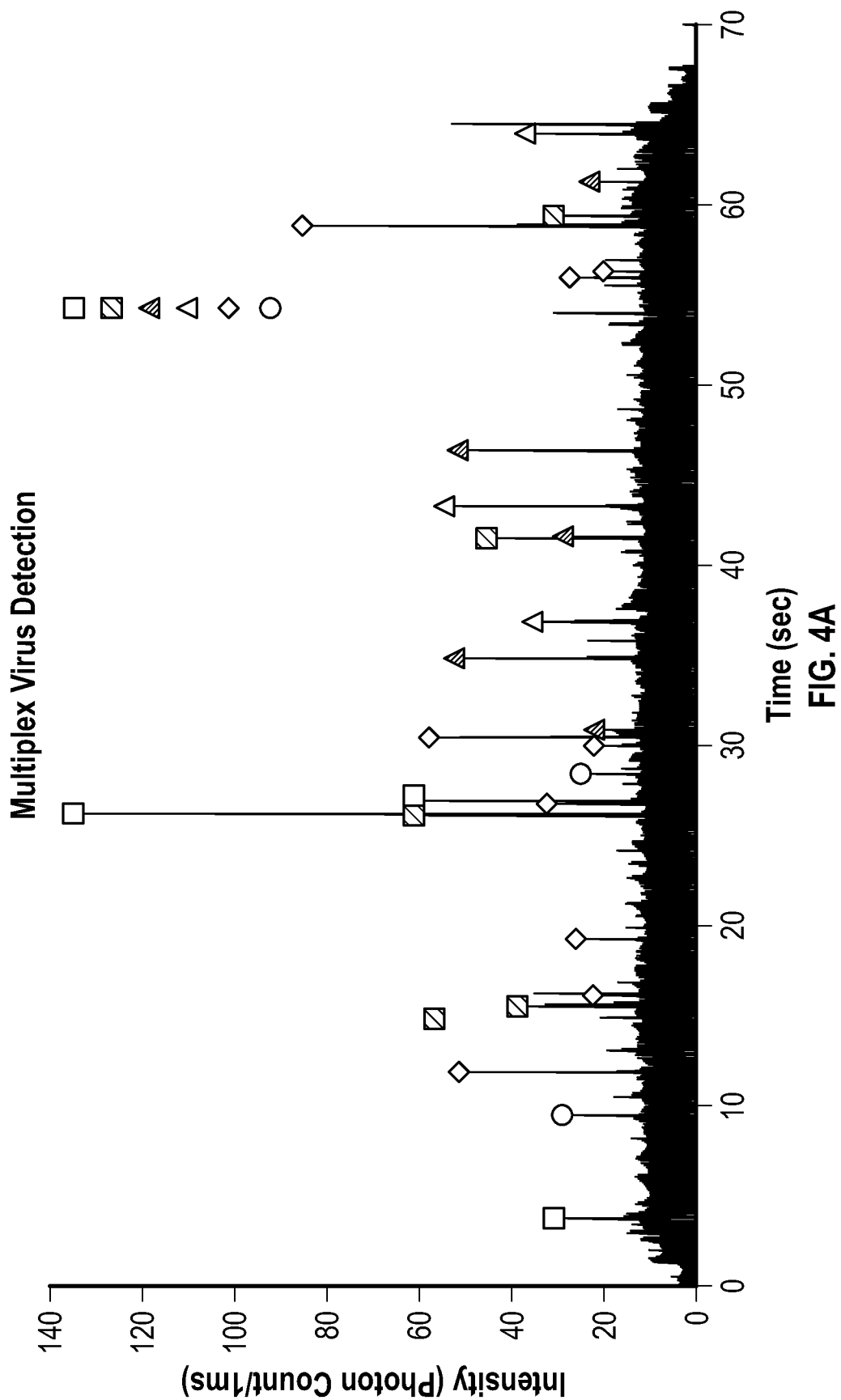

FIG. 6B

OPTOFLUIDIC ANALYTE DETECTION SYSTEMS USING MULTI-MODE INTERFERENCE WAVEGUIDES

CROSS-REFERENCE TO RELATED APPLICATIONS

The present application is a continuation of U.S. patent application Ser. No. 16/489,545, filed on Aug. 28, 2019, which is a U.S. National Phase Application of International PCT Application Serial No. PCT/US2018/020023 under 35 U.S.C. § 371 (a), filed on Feb. 27, 2018, which claims the benefit of and priority to U.S. Provisional Application Ser. No. 62/465,005, filed on Feb. 28, 2017; 62/465,008, filed on Feb. 28, 2017; 62/465,013, filed on Feb. 28, 2017; and 62/465,022, filed on Feb. 28, 2017. The entire contents of each of the foregoing applications are incorporated by reference herein.

TECHNICAL FIELD

The present disclosure relates generally to optofluidic systems, and more particularly to systems, methods, and techniques for using multimode interference (MMI) waveguides for spectral multiplexing and/or analyte detection in microfluidic channels.

BACKGROUND

Optofluidics, which integrates photonics and microfluidics, has led to highly compact and sensitive biomedical sensors. Optofluidic devices based on anti-resonant reflecting optical waveguides (ARROWs) have proven to be a highly sensitive and reconfigurable platform for fluorescence spectroscopy.

Furthermore, spectrally dependent multi-spot excitation of analytes in capillaries and chip-based microchannels has recently been introduced and demonstrated as a powerful method to implement multiplex optical analysis of biomarkers and other targets. The principle is based on using an integrated optical element, for example a multi-mode interference (MMI) waveguide to create a wavelength-dependent spot pattern in the channel through which the targets flow. For best performance and sensitivity, the spot patterns should be as clean as possible with light only at the spot locations and little background in between. In addition, signals created by multiple excitation wavelengths should be easy to pick out with an appropriate signal processing algorithm. If a single MMI waveguide is used, inter-spot background can be non-zero, and the collected fluorescence signals at different wavelengths may be of sufficiently different intensity to cause problem with color assignment.

Additionally, optical multiplexing and demultiplexing—the spatial combination or separation of signals at different wavelengths—is an important component of photonic systems, for example optical communications or integrated biosensors. Established waveguide-based methods typically use arrayed waveguide gratings (AWG), but these may not always be ideal, for example, if curved waveguides are to be avoided or if the wavelengths under consideration are relatively widely spaced. The latter is true for example in applications in multiplex detection of fluorescence using commercially available dyes in the visible range.

Furthermore, when using MMI waveguides to create wavelength-dependent spot patterns, an MMI waveguide made from solid materials may create an imperfect spot pattern due to inhomogeneity in the refractive index, and the best pattern may be shifted from the desired wavelength due to index variations or small changes in dimensions, both as results of a standard CMOS or MEMS-like microfabrication process.

SUMMARY

As discussed above, being able to identify multiple target molecules with high sensitivity improves the capability of optofluidic devices. Therefore, MMI waveguides have recently been used for multiplex detection of multiple targets by creating spectrally dependent excitation patterns in a single fluidic channel. Additionally, the multi-spot excitation approach has further increased the signal-to-noise ratio and sensitivity of these biosensors. MMI multi-spot excitation can also be used for spatially multiplexed detection by using different MMI waveguides for different channels. However, there remains a need for further-increased and further-improved multiplexing techniques. As disclosed herein, combining both spectral multiplexing and spatial multiplexing may further increase the multiplexing power and capability of optofluidic devices.

The present disclosure describes systems and methods for combined spatial and spectral multiplexed detection of optically active targets in multiple microfluidic channels by using a single MMI waveguide that intersects the fluidic channels containing target analytes, in accordance with some embodiments.

As further described above, for best performance and sensitivity using MMI waveguides to create multi-spot patterns, the spot patterns should be as clean as possible with light only at the spot locations and little background in between. In addition, signals created by multiple excitation wavelengths should be easy to pick out with an appropriate signal processing algorithm. If a single MMI waveguide is used, inter-spot background may be non-zero, and collected fluorescence signals at different wavelengths may be of sufficiently different intensity to cause problems with color assignment.

Thus, the present disclosure describes systems, methods, and techniques for spectrally multiplexed detection of optically active targets in a microfluidic channel by a two-stage photonic structure that creates color-dependent excitation spot patterns that are spatially separated. In some embodiments, a multi-stage approach features a first stage for spatial separation of light of different wavelengths (demultiplexing) and a second stage for using the demultiplexed light to create wavelength-dependent spot patterns in different parts of a capillary or channel. As described below, the techniques disclosed herein may address the problem of using a single MMI waveguide and distinguishing colors from one another in spite of inter-spot background signal.

As further described above, certain known waveguide-based methods for optical multiplexing and/or demultiplexing, such as using AWG's, may not be ideal, for example if curved waveguides are desired to be avoided, if the wavelengths under consideration are relatively widely spaced, and/or if the intended application is multiplex detection of fluorescence using commercially available dyes in the visible range (e.g., visible-range dyes may be widely spaced from one another).

Thus, described herein are systems, methods, and techniques for spatially optical multiplexing and demultiplexing using MMI waveguides, which may address the above-noted shortcomings of known methods. In some embodiments, photonic multiplexing and/or demultiplexing on a chip may be achieved via the use of one or more MMI waveguides.

MMI waveguides may create varying spatial patterns perpendicular to the light propagation direction. As described herein, by using MMI waveguides with inputs/outputs that are not centered laterally (e.g., in the direction perpendicular to the direction of propagation of light), different wavelengths of light may be multiplexed/demultiplexed from one another at distances in the direction of propagation along the MMI waveguide at which one wavelength of light forms a self-image and another wavelength of light forms a mirror image at the same distance.

As further described above, MMI waveguides made from solid materials may produce imperfect spot patterns, due to inhomogeneity in the refractive index of the solid MMI waveguide material, both as results of a complementary metal-oxide-semiconductor microfabrication, microelectromechanical systems microfabrication, or the like.

Thus, the present disclosure describes systems, methods, and techniques for spectrally multiplexed detection of optically active targets in a microfluidic channel by using a liquid-core MMI waveguide that can be tuned by core index, pressure, temperature, flow, or any combination thereof. As explained herein, liquid-core, tunable MMI waveguides (tunable LC-MMI waveguides) may address one or more of the problems with solid-core MMI waveguides discussed above, for example because liquid-core MMI waveguides may have a more uniform core and/or may be finely tunable to compensate for fabrication imperfections, such as by exchanging the core liquid (and thus changing the MMI waveguide core index), heating the core liquid, or changing the dimensions of the liquid core of the LC-MMI waveguide (e.g., in the case of using a flexible material for fabrication of the walls of the LC-MMI waveguide).

In some embodiments, a system for on-chip analyte detection is provided, comprising: a substrate; a first analyte channel, disposed on the substrate, configured to receive a first liquid containing first analytes to be detected by the system; a second analyte channel, disposed on the substrate, configured to receive a second liquid containing second analytes to be detected by the system; a multi-mode interference (MMI) waveguide, disposed on the substrate, that intersects the first analyte channel at a first position and the second analyte channel at a second position, wherein the MMI waveguide is configured to: receive input light of a first wavelength and input light of a second wavelength; generate a first spot pattern having a first number of spots of light of the first wavelength incident on the first analyte channel; generate a second spot pattern having a second number of spots of light of the first wavelength incident on the second analyte channel; generate a third spot pattern having a third number of spots of light of the second wavelength incident on the first analyte channel; and generate a fourth spot pattern having a fourth number of spots of light of the second wavelength incident on the second analyte channel; a detector configured to detect fluorescence bursts from an analyte excited by one of the first spot pattern, the second spot pattern, the third spot pattern, and the fourth spot pattern; and one or more processors configured to: receive a signal from the detector representing the detected fluorescence bursts; determine, based on a detected number of bursts in the received signal, whether the signal corresponds to the first channel or to the second channel; and determine, based on the detected number of bursts in the received signal, whether the signal corresponds to the first wavelength of light or to the second wavelength of light.

In some embodiments, a system for on-chip analyte detection is provided, comprising: a substrate; an analyte channel, disposed on the substrate, configured to receive a liquid containing analytes to be detected by the system; one or more first waveguides, disposed on the substrate, that intersect the analyte channel, wherein the one or more first waveguides are configured to receive input light of a first wavelength at a first input port and to direct a first multi-spot pattern generated from the input light of the first wavelength onto the intersecting analyte channel; one or more second waveguides, disposed on the substrate, that intersect the analyte channel, wherein the one or more second waveguides are configured to receive input light of a second wavelength at a second input port and to direct a second multi-spot pattern generated from the input light of the second wavelength onto the intersecting analyte channel; and a demultiplexing multi-mode interference (MMI) waveguide, disposed on the substrate, the demultiplexing MMI waveguide comprising: a third input port, disposed at a first end of the demultiplexing MMI waveguide, configured to receive input light of the first wavelength and input light of the second wavelength; a first output port, disposed at a second end of the demultiplexing MMI waveguide opposite the first end, wherein light of the first wavelength is directed to the first input port of the first set of one or more waveguides; and a second output port, disposed at the second end of the demultiplexing MMI waveguide, configured to output a mirror-image of light of the second wavelength, wherein light of the second wavelength is directed to the second input port of the second set of one or more waveguides.

In some embodiments, a system for on-chip analyte detection is provided, comprising: a substrate; an analyte channel, disposed on the substrate, configured to receive a liquid containing analytes to be detected by the system; and a demultiplexing multi-mode interference (MMI) waveguide, disposed on the substrate, the demultiplexing MMI waveguide comprising: a first input port, disposed at a first end of the demultiplexing MMI waveguide, configured to receive input light of a first wavelength and input light of a second wavelength; a first output port, disposed at a second end of the demultiplexing MMI waveguide opposite the first end of the demultiplexing MMI waveguide, configured to output light of the first wavelength; and a second output port, disposed at the second end of the demultiplexing MMI waveguide, configured to output light of the second wavelength; wherein the demultiplexing MMI waveguide is configured to direct output light of the first wavelength and output light of the second wavelength to be incident on the analyte channel to excite one or more analytes in the channel.

In some embodiments, a system for on-chip analyte detection is provided, comprising: a substrate; an analyte channel, disposed on the substrate, configured to receive a liquid containing analytes to be detected by the system; and a multiplexing multi-mode interference (MMI) waveguide, disposed on the substrate, the demultiplexing MMI waveguide comprising: a first input port, disposed at a first end of the multiplexing MMI waveguide, configured to receive light of a first wavelength; a second input port, disposed at the first end of the multiplexing MMI waveguide, configured to receive light of a second wavelength; and an output port, disposed at a second end of the multiplexing MMI waveguide opposite the first end of the multiplexing MMI waveguide, configured to output light of the first wavelength and light of light of the second wavelength; wherein the multiplexing MMI waveguide is configured to direct output light of the first wavelength and output light of the second wavelength to be incident on the analyte channel to excite one or more analytes in the channel.

In some embodiments, a system for on-chip analyte detection is provided, comprising: a substrate; a first analyte channel, disposed on the substrate, configured to receive a first solution containing first analytes to be detected by the system; and an adjustable liquid-core multi-mode interference (LC-MMI) waveguide, disposed on the substrate, that intersects the first analyte channel, the LC-MMI waveguide comprising: a first liquid-core portion comprising: a hollow channel configured to receive a first fluid; and side walls bounding the hollow channel; and a first opening configured to allow the first fluid to flow into or out of the hollow channel; and a first optical input port configured to receive input light of a first wavelength; wherein the LC-MMI waveguide is configured to direct a first multi-spot pattern generated from the input light of the first wavelength onto the intersecting first analyte channel.

BRIEF DESCRIPTION OF THE DRAWINGS

FIGS. 4A & 4B depict fluorescence signals and excitation patterns for viruses in three different channels excited by multiplexed light at two different wavelengths, in accordance with some embodiments.

FIG. 6B depicts simulated optical signals generated by an MMI-based multi-stage multiplexing system, in accordance with some embodiments.

DETAILED DESCRIPTION OF ILLUSTRATIVE EMBODIMENTS

Spectral, Spatial, and Spectral-Spatial Multiplex Analyte Detection in Multiple Fluidic Channels Using MMI Waveguides In some embodiments, a multiple-target sensing platform may combine spatial multiplexing and spectral multiplexing of bioparticles, by using multiple (e.g., two or more) different excitation wavelengths along an MMI waveguide and creating multi-spot patterns that are both channel-dependent and color-dependent in multiple (e.g., two, three, or more) separate intersecting fluidic channels. The number of spots for each fluorescence signal may provide direct identification of multiple targets with high sensitivity.

A wide, solid-core optical waveguide that acts as a MMI waveguide may be used to create location-dependent multi-spot patterns for multiple orthogonally intersecting liquid-core waveguides. The MMI waveguide may support numerous waveguide modes with different propagation constants and allows them to interfere with each other as they propagate along the MMI structure. At certain propagation distances where the relative phases of these modes match up correctly, well-defined spot pattern may be created. Because the multi-spot patterns created by the modes may be different at different distances along the MMI waveguide in the direction of propagation, multi-spot patterns for the same wavelength of light propagating through the MMI waveguide may be different at multiple intersecting liquid-core channels/waveguides that intersect the MMI waveguide at different distances along the MMI waveguide.

Figure 1A:
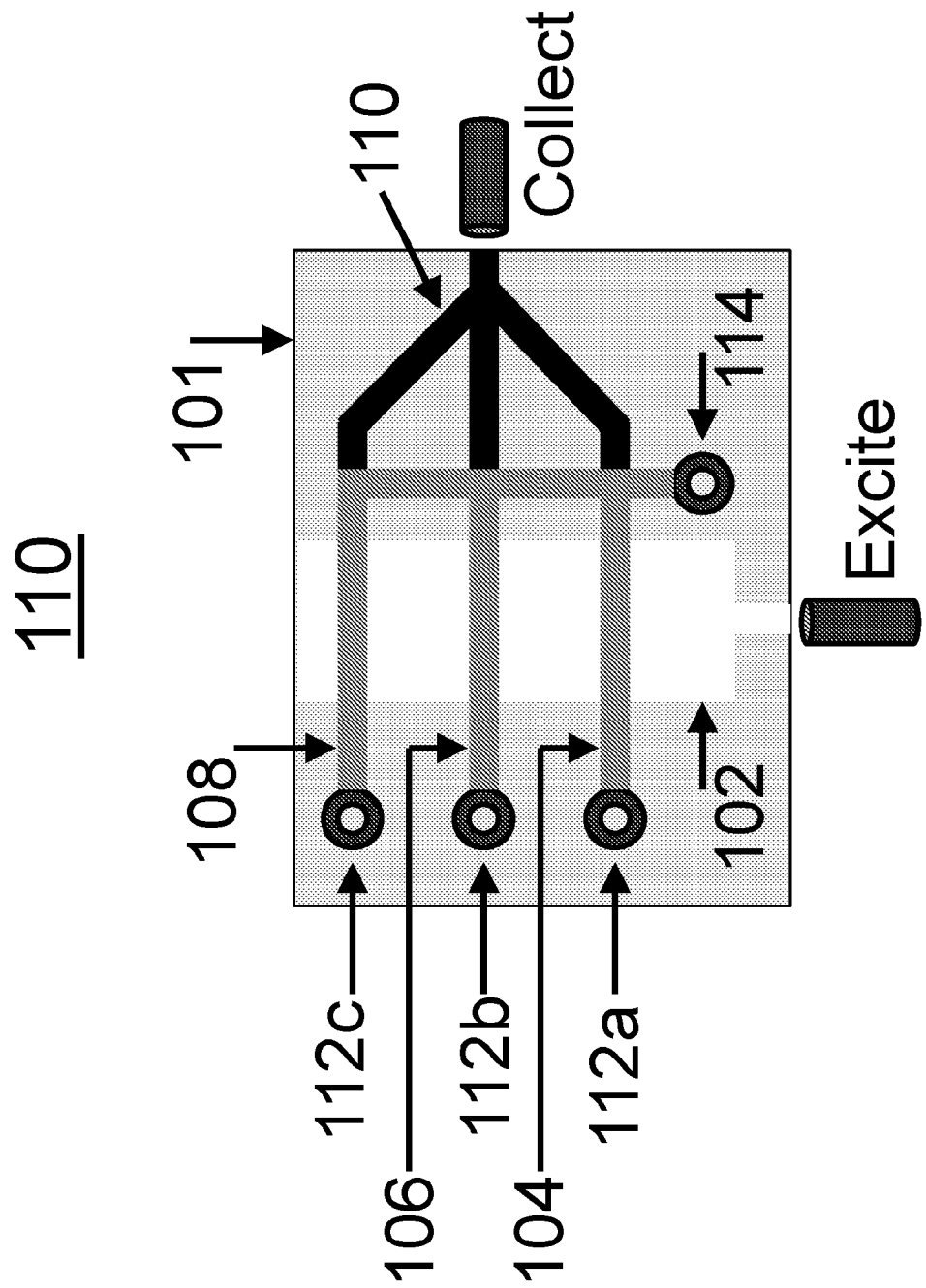
FIGS. 1A & 1B depict schematic views of an optofluidic platform, in accordance with some embodiments.
Figure 1B:
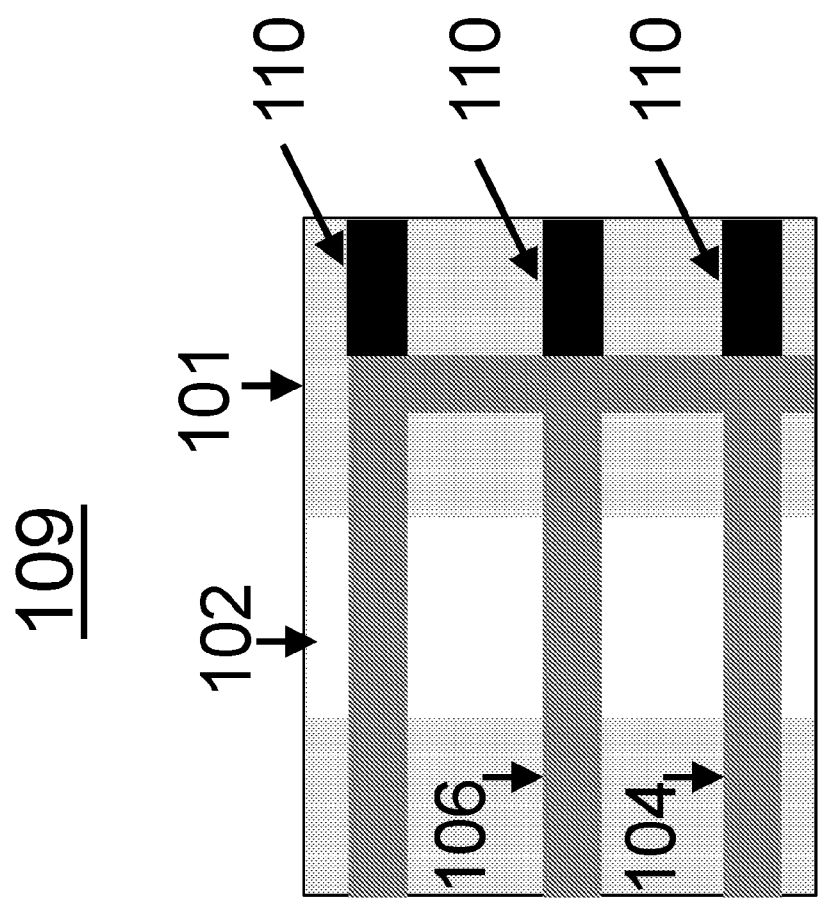

In the embodiment of FIGS. 1A and 1B showing platform 100, three liquid-core waveguides 104, 106, and 108 along an MMI waveguide 102 are shown such that they intersect the MMI waveguide 102 at positions that correspond to well-defined, integer numbers of spots, for different excitation wavelengths.

FIG. 1A shows a schematic view of the optofluidic platform 100 where the MMI waveguide 102 intersects three different liquid-core waveguides (104, 106, and 108) at different distances L (in the direction of propagation of light along the MMI waveguide) from the beginning of the MMI waveguide (e.g., from the optical input port of the MMI waveguide). In some embodiments, the liquid-core waveguides may be configured to receive one or more liquid solutions comprising one or more fluorescence-tagged analytes to be detected by the system, such as molecules, particles, biomarkers, nucleic acids, DNA, proteins, and the like.

In some embodiments, the liquid-core waveguides may be configured to allow the analyte solution to flow along a hollow channel in the center of the waveguide, such that analytes in the liquid flow past the spot patterns caused to be incident on the waveguide by the MMI waveguide. In some embodiments, flow through the analyte channels may be caused by pressure applied to the fluid in the analyte channels (e.g., by one or more pumps) to cause the fluid to flow, such that the analytes pass by the excitation spots. In some embodiments, flow may be induced electroosmotically. In some embodiments, movement of analyte particles through the analyte solution may be induced without flow of the analyte solution, or in addition to flow of the analyte solution, such as by electrophoresis.

As each analyte is excited by the spots of the spot pattern formed by the MMI waveguide, fluorescence emission of the analytes may be guided by the liquid-core waveguide toward a detector that may detect respective fluorescence emission bursts attributable to each of the signals.

As shown in FIG. 1A, each of the liquid-core waveguides may be fluidly connected to a respective input well 112a-c, and to a single fluid output well 114. In some embodiments, one or more liquid-core waveguide may have a dedicated output well not shared by other liquid-core waveguides.

As shown, the platform may comprise an MMI waveguide 102 intersecting three separate liquid-core waveguides (104, 106, and 108), and a Y-coupler 109 to combine all the signals of fluorescence emissions from excited particles in the liquid-core waveguides. In some embodiments, any suitable combination of one or more waveguides, couplers, lenses, mirrors, MMI waveguides, or other optical elements may be used to transport fluorescence emission light from the particles excited in the liquid-core waveguides to the detector.

In some embodiments, the detector may be disposed in-plane with the liquid-core waveguides, on a substrate of platform 100, such as when platform 100 is a chip. In some embodiments, the detector may be configured to detect fluorescence emissions of various different wavelengths.

In some embodiments, MMI waveguide 102 may be made from oxides such as $SiO_2$, nitrides such as SiN, oxynitrides such as SiON, PDMS, plastics, and/or semiconductors. In some embodiments, a height of MMI waveguide 102 may be greater than or equal to: 0.01 μm, 0.05 μm, 0.1 μm, 0.5 μm, 1 μm, 2 μm, 5 μm, 10 μm, or 20 μm. In some embodiments, a height of MMI waveguide 102 may be less than or equal to: 0.01 μm, 0.05 μm, 0.1 μm, 0.5 μm, 1 μm, 2 μm, 5 μm, 10 μm, or 20 μm. In some embodiments, a height of MMI waveguide 102 may be between 0.1 μm and 5 μm.

In some embodiments, a width of MMI waveguide 102 may be greater than or equal to: 1 μm, 5 μm, 10 μm, 25 μm, 50 μm, 100 μm, 250 μm, 500 μm, or 1000 μm. In some embodiments, a width of MMI waveguide 102 may be less than or equal to: 1 μm, 5 μm, 10 μm, 25 μm, 50 μm, 100 μm, 250 μm, 500 μm, or 1000 μm. In some embodiments, a width of MMI waveguide 102 may be between 10 μm and 250 μm.

In some embodiments, a length of MMI waveguide 102 may be greater than or equal to: 0.1 mm, 0.25 mm, 0.5 mm, 1 mm, 5 mm, 10 mm, 20 mm, 50 mm, or 100 mm. In some embodiments, a length of MMI waveguide 102 may be less than or equal to: 0.1 mm, 0.25 mm, 0.5 mm, 1 mm, 5 mm, 10 mm, 20 mm, 50 mm, or 100 mm. In some embodiments, a length of MMI waveguide 102 may be between 0.5 mm and 20 mm.

While MMI waveguide 102 is shown in the example of the figures as rectangular, it may in some embodiments have a square, round, semi-circular, or any suitable cross-sectional shape.

In some embodiments, any one or more of liquid-core waveguides 104, 106, or 108 may be made from oxides such as $SiO_2$, nitrides such as SiN, oxynitrides such as SiON, PDMS, plastics, and/or semiconductors. In some embodiments, the liquid solution inside any one or more of liquid-core waveguides 104, 106, or 108 may comprise $H_2O$, ethylene glycol, and/or ethyl cinnamate. In some embodiments, the liquid solution inside any one or more of liquid-core waveguides 104, 106, or 108 may comprise zinc iodide liquid, ethylene glycol liquid, sodium iodide solutions, or any other suitable liquid having an index of refraction that is greater than an index of refraction of a cladding, including, for example:

zinc iodide dissolved in water;
sodium iodide dissolved in water;
$ZnCl_2$ dissolved in water;
ionic liquids, such as (cation/anion):
    (1-Et-3-Me-Im-N)/$(SO_2F)_2$)
    (1-Et-3-Me-Im-N/$(CN)_2$);
    (1-Et-3-Me-Im/TCB);
    (1-Et-3-Me-Im/SCN);
    (1-Et-3-Me-Im/$SO_3OH$);
    (1-Et-3-Me-Im/$SO_3CH_3$);
    (Et-Py-N/$(SO_2F)_2$); and/or
    (He-Py-N/$(SO_2F)_2$);
other ionic liquids, such as:
    choline dihydrogen phosphate; and/or
    deep eutectic solvent;
ethylene glycol
organic liquids, such as:
    benzyl benzoate;
    2-bromethyl benzene;
    DMSO;
    1,1,2,2-tetrabromoethane;
    1,1,2,2-tetrachloroethane; and/or
    Tetrachloroethylene; and/or
aqueous solutions, such as:
    $AgNO_3$;
    $CdCl_2$;
    KBr+HgBr;
    $Hg(NO_3)_2$:$H_2O$+$HgBr_2$; and/or
    $Hg(NO_3)_2$:$H_2O$+$HgI_2$.

In some embodiments, a height of any one or more of liquid-core waveguides 104, 106, or 108 may be greater than or equal to: 0.1 μm, 0.5 μm, 1 μm, 2 μm, 5 μm, 10 μm, 25 μm, or 50 μm. In some embodiments, a height of any one or more of liquid-core waveguides 104, 106, or 108 may be less than or equal to: 0.1 μm, 0.5 μm, 1 μm, 2 μm, 5 μm, 10 μm, 25 μm, or 50 μm. In some embodiments, a height of any one or more of liquid-core waveguides 104, 106, or 108 may be between 1 μm and 10 μm.

In some embodiments, a width of any one or more of liquid-core waveguides 104, 106, or 108 may be greater than or equal to: 0.1 µm, 0.5 µm, 1 µm, 2 µm, 5 µm, 10 µm, 20 µm, 50 µm, or 100 µm. In some embodiments, a width of any one or more of liquid-core waveguides 104, 106, or 108 may be less than or equal to: 0.1 µm, 0.5 µm, 1 µm, 2 µm, 5 µm, 10 µm, 20 µm, 50 µm, or 100 µm. In some embodiments, a width of any one or more of liquid-core waveguides 104, 106, or 108 may be between 1 µm and 20 µm.

In some embodiments, a length of any one or more of liquid-core waveguides 104, 106, or 108 may be greater than or equal to: 0.01 mm, 0.05 mm, 0.1 mm, 0.5 mm, 1 mm, 5 mm, 10 mm, 20 mm, 50 mm, or 100 mm. In some embodiments, a length of any one or more of liquid-core waveguides 104, 106, or 108 may be less than or equal to: 0.01 mm, 0.05 mm, 0.1 mm, 0.5 mm, 1 mm, 5 mm, 10 mm, 20 mm, 50 mm, or 100 mm. In some embodiments, a length of any one or more of liquid-core waveguides 104, 106, or 108 may be between 0.1 mm and 20 mm.

While liquid-core waveguides 104, 106, or 108 are shown in the example of the figures as rectangular, any one or more of them may in some embodiments have a square, round, semi-circular, or any suitable cross-sectional shape.

In some embodiments, a fluid flow rate through any one or more of liquid-core waveguides 104, 106, or 108 may be greater or equal to 0.1 µm/s, 0.5 µm/s, 1 µm/s, 10 µm/s, 100 µm/s, 1 mm/s, 1 cm/s, 5 cm/s, 10 cm/s, 20 cm/s, or 50 cm/s. In some embodiments, a fluid flow rate through any one or more of liquid-core waveguides 104, 106, or 108 may be less or equal to 0.1 µm/s, 0.5 µm/s, 1 µm/s, 10 µm/s, 100 µm/s, 1 mm/s, 1 cm/s, 5 cm/s, 10 cm/s, 20 cm/s, or 50 cm/s. In some embodiments, a fluid flow rate through any one or more of liquid-core waveguides 104, 106, or 108 may be between 1 µm/s and 10 cm/s.

In some embodiments, one or more components of platform 100 and/or associated systems may be disposed on a substrate 101, which may in some embodiments be the substrate of a chip. In some embodiments, substrate 101 may have a length and/or a width greater than or equal to: 0.5 mm, 1 mm, 2 mm, 5 mm, 1 cm, 2 cm, 5 cm, 10 cm, or 20 cm. In some embodiments, substrate 101 may have a length and/or a width less than or equal to: 0.5 mm, 1 mm, 2 mm, 5 mm, 1 cm, 2 cm, 5 cm, 10 cm, or 20 cm. In some embodiments, substrate 101 may have a length and/or a width between 2 mm and 5 cm.

FIG. 1B shows a zoomed view of the platform 100 shown in FIG. 1A.

FIGS. 1C-1F show alternate embodiments of optofluidic platforms using one or more MMI waveguides to direct one or more spot patterns onto analytes in one or more analyte channels. In some embodiments, the optofluidic platforms and/or their subcomponents discussed below with respect to FIGS. 1C-1F may share any one or more characteristics in common with optofluidic platform 100 and/or its subcomponents, respectively, as discussed above. As shown in the figures and discussed below, the platforms of FIGS. 1C-1F may comprise different spatial arrangements of similar optical and fluidic components as discussed above with respect to platform 100 and FIGS. 1A and 1B.

Figure 1C:
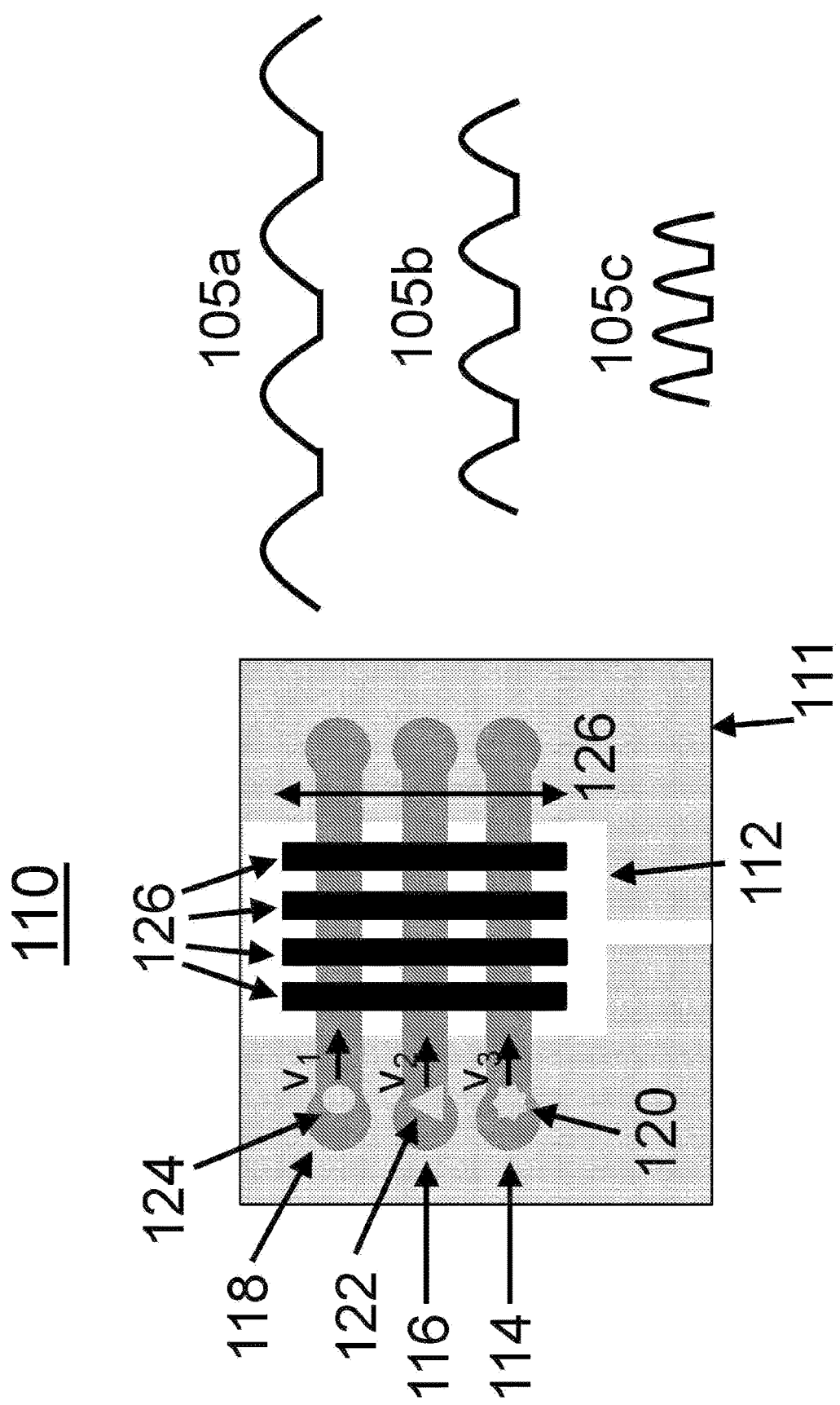
FIG. 1C depicts a schematic view of an optofluidic platform with analytes traveling at different velocities and corresponding fluorescence emission signals, in accordance with some embodiments.

FIG. 1C shows, at left, a schematic view of optofluidic platform 110 comprising substrate 111, in which MMI waveguide 112 intersects three different analyte channels (114, 116, and 118) at different distances L (in the direction of propagation of light along the MMI waveguide) from the beginning of the MMI waveguide (e.g., from the optical input port of the MMI waveguide shown at the bottom of FIG. 1C). FIG. 1C further shows, at right, exemplary fluorescence output signals generated by an analyte located in a respective one of the three analyte channels of platform 110.

In some embodiments, platform 110 may differ from platform 100 in that the three different analyte channels 114, 116, and 118 in platform 110, which may also serve as and be referred to as liquid-core waveguides for guiding fluorescence emission signals for analytes in the respective channels, may each intersect the same, single spot pattern. That is, while channels 104, 106, and 108 of platform 100 may intersect MMI waveguide 102 at different distances corresponding to different spot patterns (having different numbers of spots), channels 114, 116, and 118 of platform 110 may all intersect one single spot pattern, such that the same number of excitation spots may be incident on each of channels 114, 116, and 118. As shown in FIG. 1C, interference pattern 128 may form the same or substantially the same interference pattern 128 (e.g., spot pattern) on each of the three channels 114, 116, and 118; spot length 126 of interference pattern 128 may be longer than the total distance by which the three channels are spaced from one another. In some embodiments, spot length 126 may be greater than or equal to 1 µm, 5 µm, 10 µm, 25 µm, 50 µm, 100 µm, 150 µm, 200 µm, 250 µm, 300 µm, or 500 µm. In some embodiments, spot length 126 may be less than or equal to 1 µm, 5 µm, 10 µm, 25 µm, 50 µm, 100 µm, 150 µm, 200 µm, 250 µm, 300 µm, or 500 µm. In some embodiments, spot length 126 may be between 10 µm and 200 µm. In some embodiments, any two or more of channels 114, 116, and 118 may be spaced apart from one another by greater than or equal to 0.25 µm, 0.5 µm, 1 µm, 2 µm, 5 µm, 10 µm, 25 µm, 50 µm, 100 µm, 150 µm, 200 µm, or 250 µm. In some embodiments, any two or more of channels 114, 116, and 118 may be spaced apart from one another by less than or equal to 0.25 µm, 0.5 µm, 1 µm, 2 µm, 5 µm, 10 µm, 25 µm, 50 µm, 100 µm, 150 µm, 200 µm, or 250 µm. In some embodiments, any two or more of channels 114, 116, and 118 may be spaced apart from one another by between 1 µm and 150 µm.

Thus, in some embodiments, each of the three channels may be placed within a spot length of a single spot pattern of interference pattern 128, and each channel in the same spot pattern may therefore be excited by the same number of spots. (In some embodiments, a plurality of channels may be placed in one spot pattern of an interference pattern, while a different plurality of channels may be placed in another spot pattern of the same interference pattern at another distance along the same MMI waveguide).

In some embodiments, multiplexing in platform 110 may be achieved by differentiating one analyte channel from another analyte channel based on the velocity of analytes moving through the respective channels. That is, while the different analyte channels in platform 100 may be differentiated from one another for multiplexing by counting the different numbers of excitation spots (and resulting different numbers fluorescence output bursts) from analytes in each channel, analytes in each of the three channels in platform 110 may be excited by the same number of spots (from the same spot pattern) and generate the same number of fluorescence output bursts. However, as shown in FIG. 1C, analytes in each of the three channels in platform 110 may move with different respective velocities ($v_1$, $v_2$, and $v_3$, as shown), and may therefore generate fluorescence emission signals that are temporally differentiable from one another.

As shown, for example, by the three signals 105a, 105b, and 105c on the right side of FIG. 1C, analytes having faster velocities (e.g., $v_3$ in channel 114) may generate more compressed fluorescence output signals (e.g., signal 105a)

than analytes having faster velocities (e.g., $v_1$ in channel 118 generating signal 105c) when traveling through the same spot pattern. Thus, analyzing the relative widths of fluorescence bursts and/or the relative spacing of bursts from one another may allow a system or user to differentiate analytes traveling at different velocities in different analyte channels.

In some embodiments, movement of analytes through different channels at different velocities may be induced by different flow rates of fluid in the channels, and/or by electrophoretic movement under different electrophoretic forces or through fluids having different viscosities.

Figure 1D:
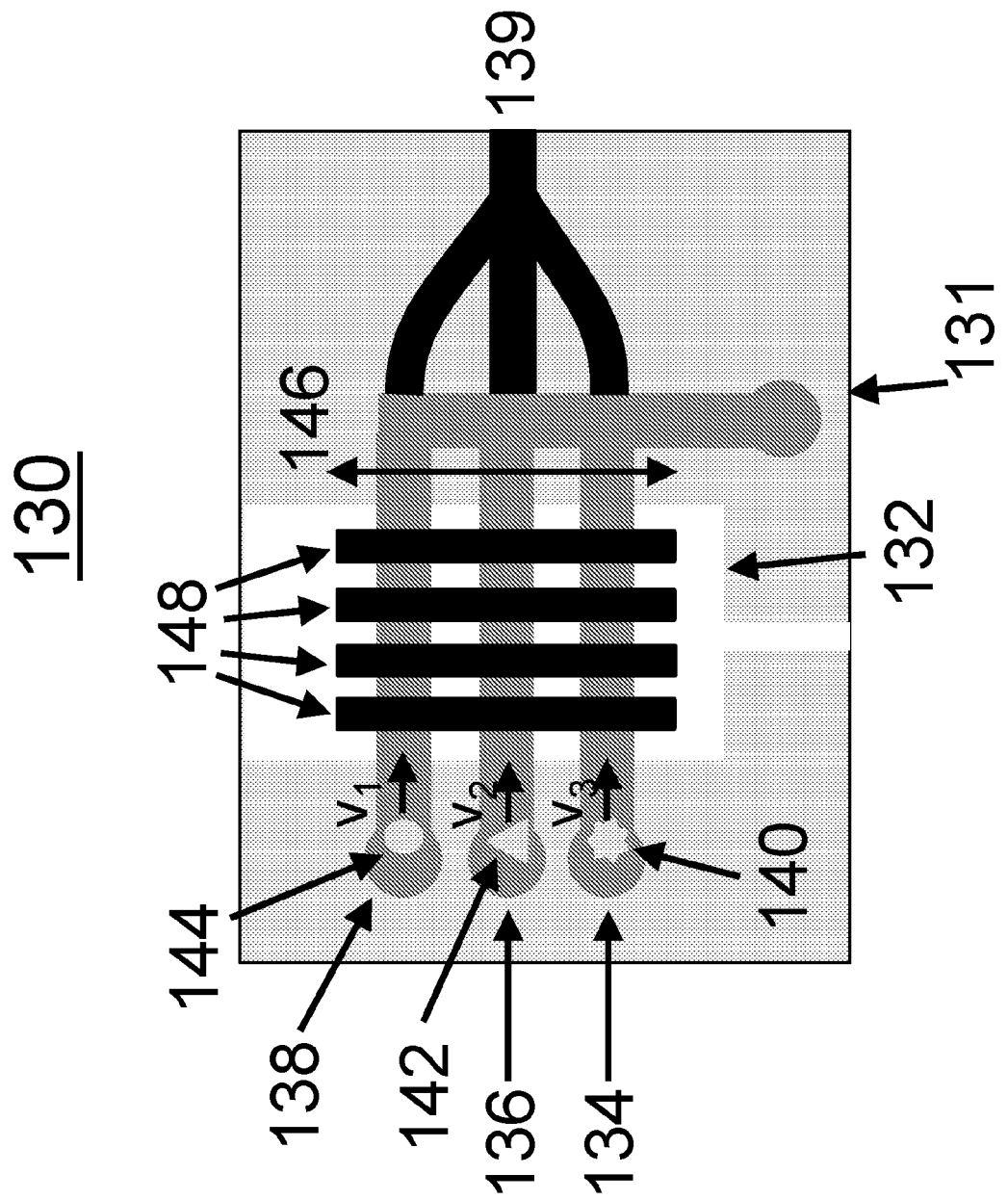
FIG. 1D depicts a schematic view of an optofluidic platform with analytes traveling at different velocities, in accordance with some embodiments.

FIG. 1D shows a schematic view of optofluidic platform 130 comprising substrate 131, in which MMI waveguide 132 intersects three different liquid-core waveguides (134, 136, and 138) at different distances L (in the direction of propagation of light along the MMI waveguide) from the beginning of the MMI waveguide (e.g., from the optical input port of the MMI waveguide shown at the bottom of FIG. 1D).

In some embodiments, platform 130 may share one or more characteristics in common with platform 110 described above with respect to FIG. 1C, but may differ from platform 110 in that each of channels 134, 136, and 138, which may also serve as and be referred to as liquid-core waveguides for guiding fluorescence emission signals for analytes in the respective channels, may join one another and flow toward a common downstream output area. Furthermore, as shown, platform 130 may comprise Y-coupler 139, which may share any one or more characteristics in common with Y-coupler 109 discussed above with respect to FIG. 1A. In some embodiments, Y-coupler 139 may be configured to allow collection of fluorescence output signals from two or more of the channels 134, 136, and 138, in the plane of the channels, simultaneously. As shown, because the analyte channels all divert at right angles on the left side of platform 130, Y-coupler 139 is able to efficiently couple to the analyte channels, which also serve as liquid-core waveguides, to efficiently receive and then combine the fluorescence emission signals guided by the analyte channels, for example to be guided to a single detector for detection.

Figure 1E:
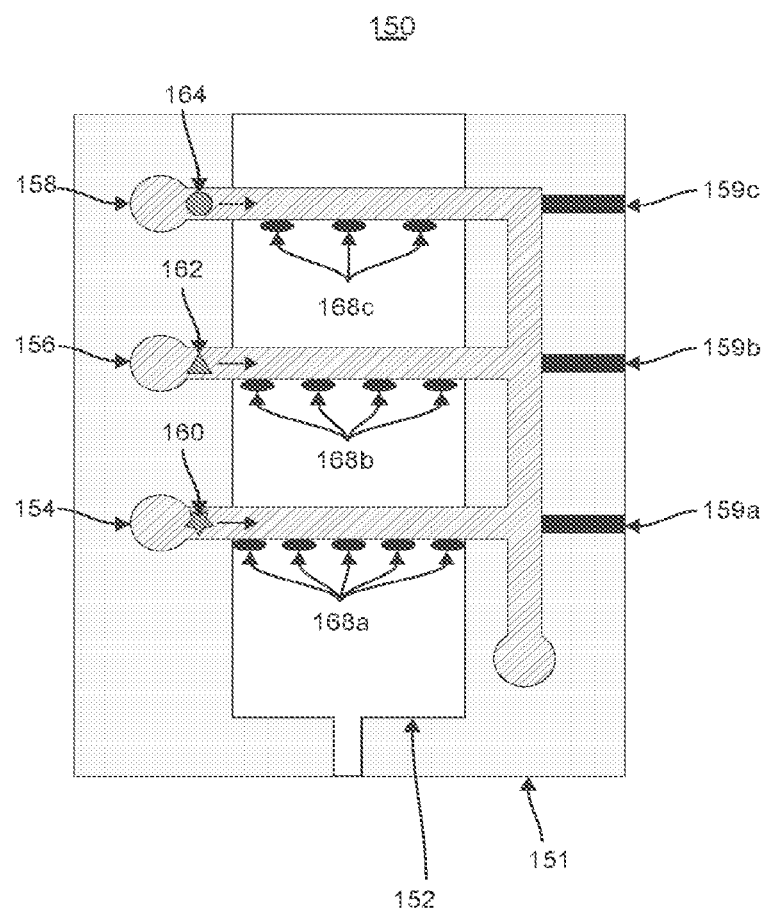
FIG. 1E depicts a schematic view of an optofluidic platform, in accordance with some embodiments.

FIG. 1E shows a schematic view of optofluidic platform 150 comprising substrate 151, in which MMI waveguide 152 intersects three different liquid-core waveguides (154, 156, and 158) at different distances L (in the direction of propagation of light along the MMI waveguide) from the beginning of the MMI waveguide (e.g., from the optical input port of the MMI waveguide shown at the bottom of FIG. 1E).

Unlike platforms 110 and 130 shown in FIGS. 1C and 1D, the analyte channels (which may also be referred to and serve as liquid-core waveguides) 154, 156, and 158 in platform 150 may each intersect the MMI waveguide 152 at a location corresponding to a different spot pattern. As shown in FIG. 1E, channels 154, 156, and 158 intersect MMI waveguide 152 at locations corresponding to spot patterns if interference pattern having five spots (168a), four spots (168b), and three spots (168c), respectively. As shown, fluorescence emission signals from analytes excited by the spot patterns of platform 150 may be guided to and collected by waveguides 159a, 159b, and 159c, depending on the channel in which the emission signal originated. In some embodiments, waveguides 159a, 159b, and 159c may join together to form a Y-coupler, and/or may guide fluorescence emission signals to one or more detectors. In some embodiments, waveguides 159a, 159b, and 159c may not all join together, and/or may guide fluorescence emission signals to two or more distinct detectors.

In some embodiments, platform 150 and its subcomponents may share any one or more characteristics in common with platform 100 and its corresponding subcomponents described above with respect to FIGS. 1A and 1B. As explained with regard to FIGS. 1A and 1B, and as explained further below, multiplexing may similarly be achieved in platform 150 counting the different numbers of fluorescence bursts in fluorescence emission signals and thereby inferring the number of excitation spots incident on the analyte channel in which the emission signal originated, thus allowing a system or user to differentiate emission signals coming from analyte channels on which a different number of excitation spots are incident.

Figure 1F:
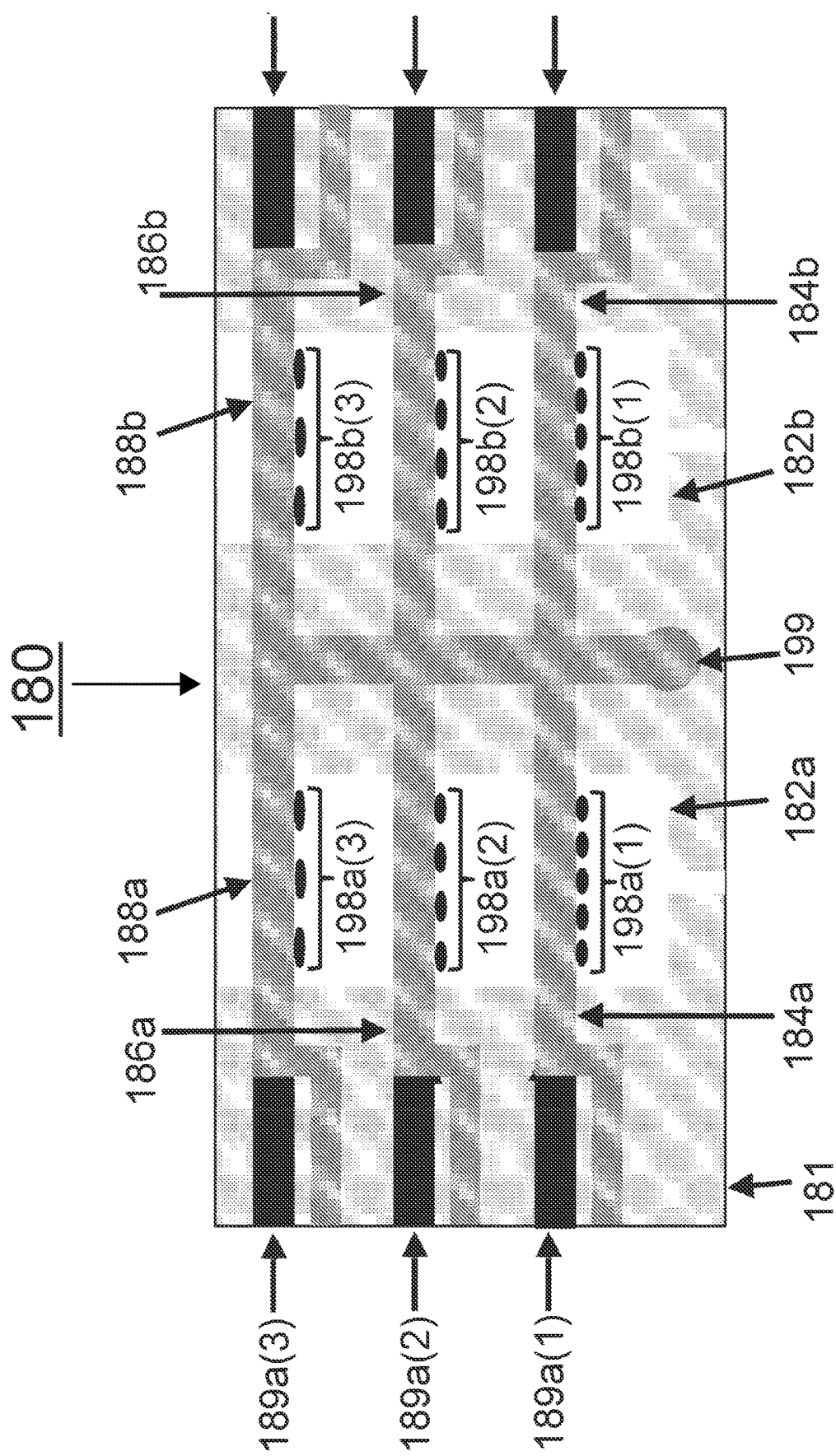
FIG. 1F depicts a schematic view of an optofluidic platform with multiple MMI's, in accordance with some embodiments.

FIG. 1F shows a schematic view of optofluidic platform 180 comprising substrate 181, in which two MMI waveguides 182a and 182b are each intersected by three different liquid-core waveguides (184a, 186a, and 188a) at different distances L (in the direction of propagation of light along the MMI waveguide) from the beginning of the MMI waveguide (e.g., from the optical input port of the MMI waveguide shown at the bottom of FIG. 1F).

In some embodiments, platform 180 may share any one or more characteristics in common with platform 150 described above with respect to FIG. 1E, except that platform 180 may be two-sided and/or symmetrical. As shown, platform 180 may comprise analyte channels (which may also be referred to and serve as liquid-core waveguides) 184a, 186a, and 188a that extend in two different (opposite) directions from a common channel source 199 at the center of substrate 181. By extending in two different directions, the analyte channels may intersect one MMI waveguide 182a on one side and another MMI waveguide 182b on the other side. As shown, spot patterns 198a(1), 198a(2), and 198a(3) may be incident on channels 184a, 186a, and 188a, respectively, at the locations at which the respective channels intersect MMI waveguide 182a. On the other side of substrate 181, spot patterns 198b(1), 198b(2), and 198b(3) may be incident on channels 184a, 186a, and 188a, respectively, at the locations at which the respective channels intersect MMI waveguide 182b.

In some embodiments, the left-side spot patterns and right-side spot patterns may be the same or different wavelengths, and may have the same or different numbers of spots per pattern. In some embodiments, MMI waveguides 182a and 182b may share any one or more properties in common with one another, but they may also differ from one another in size, width, height, material from which they are made, angle disposed on substrate 181, or any other suitable property. While channels 184a, 186a, and 188a are shown in FIG. 1F as being symmetrical, they may in some embodiments have different shapes and spatial arrangements on one side of substrate 181 versus the other, such that they may, for example, intersect MMI waveguides 182a and 182b at different respective distances L along each MMI waveguide. Non-symmetrical arrangements in two-sided, two-MMI-waveguide platforms may, in some embodiments, allow for different wavelengths of excitation light to be used in different MMI waveguides, and for multiplexed data to therefore be collected and analyzed.

As shown in FIG. 1F, fluorescence emission signals from analytes excited by the spot patterns of platform 180 may be guided to and collected by waveguides 189a(1), 189a(2), and 189a(3) on the left side of platform 181 and waveguides 189b(1), 189b(2), and 189b(3) on the right side of platform 181, depending on the channel in which the emission signal originated. In some embodiments, one or more of the waveguides may join together to form one or more Y-couplers, and/or may guide fluorescence emission signals to one or more detectors.

In some embodiments, any one or more components of platforms 100, 110, 130, 150, 170, and/or 180 may be combined with any one or more components of one another, and/or with any one or more components of any of the other systems, platforms, or devices described herein.

Figure 2:
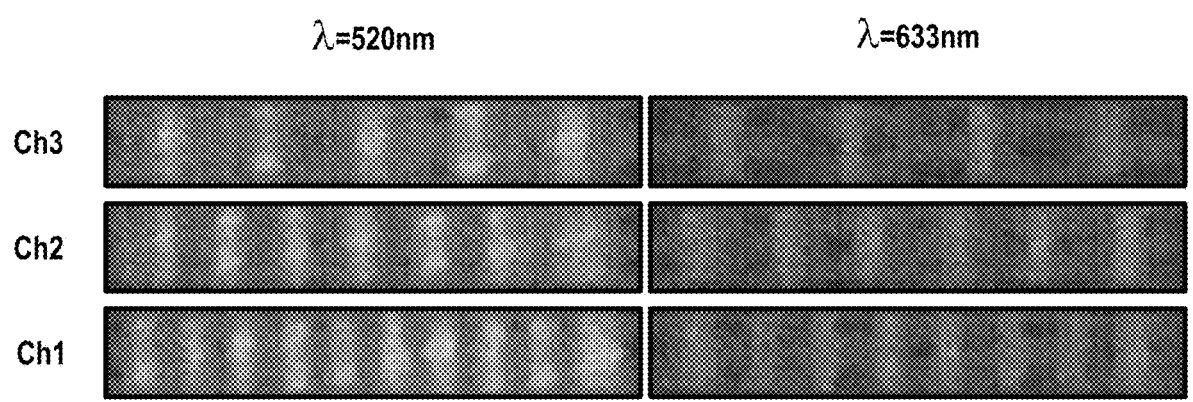
FIG. 2 depicts excitation patterns created by three different channels excited by multiplexed light at two different wavelengths, in accordance with some embodiments.

FIG. 2 depicts photographs of excitation patterns in three different channels for two wavelengths. The channels are filled with fluorescent liquid for imaging in the photograph. The product of spot number N and distance L for a specific MMI waveguide and a wavelength λ may be given by:

$$N \cdot L = \frac{n_c w^2}{\lambda} \quad (1)$$

where w is the effective MMI waveguide width (in the example shown in FIG. 1A, 75 μm plus the penetration depth of the mode into the claddings), $n_c$ is the effective refractive index of the MMI waveguide (in the example shown in FIG. 1A, 1.46), and λ is the excitation wavelength (in the example shown in FIG. 1(a), 762 nm). Thus, three spot patterns having eight, six, and four well-defined spots may be produced at the MMI waveguide lengths of $L_1$=1426 μm, $L_2$=1895 μm, and $L_3$=2847 μm, respectively. For a same or similar system, using Eqn. (1), λ=520 nm excitation wavelength may create spot-patterns having ten, seven, and five well-defined spots at the same three MMI waveguide lengths ($L_1$=1426 μm, $L_2$=1895 μm, and $L_3$=2847 μm), respectively.

By causing light of more than one wavelengths to simultaneously propagate along the same MMI waveguide, both spatial and spectral properties of MMI waveguides may be combined to create a number of distinct spot patterns for multiplexing, wherein the number is greater than the number of different intersecting channels (e.g., the product of the number of different intersecting channels and the number of different wavelengths of light), from a single MMI waveguide. That is, for light of two different wavelengths $\lambda_1$=762 nm and $\lambda_2$=520 nm as discussed above, and using three intersecting channels, six different spot patterns (having eight, six, four, ten, seven, and five spots, respectively) may be produced; each of the spot patterns may be distinguished from one or more of the other spot patterns by noting the difference in the number of spots or the time spacing between signals from adjacent spots.

FIG. 2 shows excitation patterns, in some embodiments, that may be created when three intersecting fluidic channels are filled with solutions containing fluorescent liquid and imaged with an overhead CCD camera. As shown in FIG. 2, the resulting excitation patterns may show well-defined excitation spots for all three channels, with the different spot patterns having eight, six, four, ten, seven, and five spots, respectively, as discussed above.

Example 1

For demonstration of a spatially multiplexed biosensing virus detection assay, H2N2 deactivated virus type was labeled with red (Dylight 633) fluorescent dye and H1N1 deactivated virus type was labeled with green (Dylight 550) fluorescent dye. They were mixed and pipetted into three input reservoirs covering the ends of three separate fluidic channels all intersecting the same MMI waveguide at three different respective distances L from the end of the MMI waveguide, in an arrangement such as the one shown in FIG. 1A. A laser tuned to 633 nm and 520 nm was used to excite the labeled viruses with both wavelengths at the same time and a vacuum was applied to the outlet reservoir to induce particle flow. As the viruses traveled down the liquid-core waveguides, they passed through different numbers of excitation spots, depending on the channel in which they were traveling. As they passed through the excitation spots, they were excited by different numbers of excitation spots (e.g., different spot patterns) in accordance with the color with which they were tagged. The fluorescence emission signals of the particles were captured by the respective liquid-core waveguides in which the particles were traveling, then collected by solid-core collection waveguides and combined into a single output waveguide by using a 3×1 Y-junction (see, e.g., FIG. 1A). The signal was then passed through bandpass and notch optical filters to eliminate the excitation wavelengths, and was finally detected by a single-photon-counting detector.

Figure 3A:
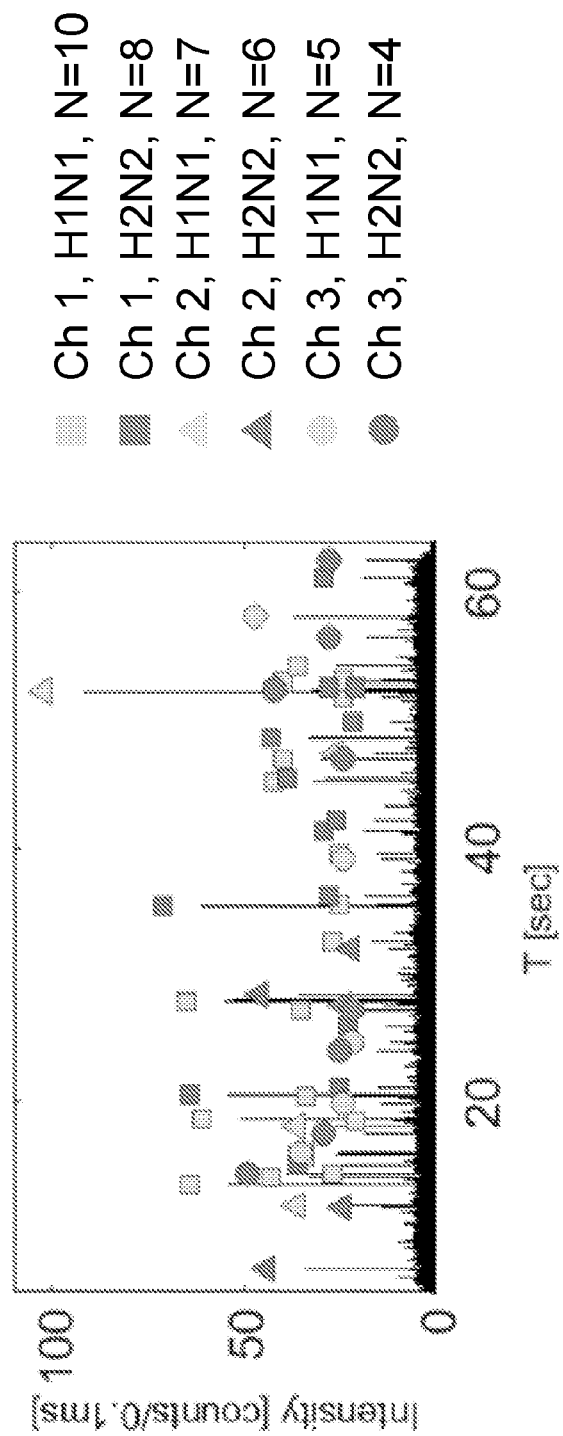
FIGS. 3A & 3B depict fluorescence signals for viruses in three different channels excited by multiplexed light at two different wavelengths, in accordance with some embodiments.

FIG. 3A shows resulting fluorescence signals with different numbers of peaks, each peak emitted from either H1N1 or H2N2 virus from one of three different channels. The analytes were excited by both wavelengths λ=520 nm and λ=633 nm. By counting the number of peaks, the six separate multiplexing routes were distinguished from one another, and both the channel and the type of virus for each peak were identified. Automatically generated results, when compared to manual inspection, gave 3% error during the identification, due to distorted signal caused by the flow variations.

Figure 3B:
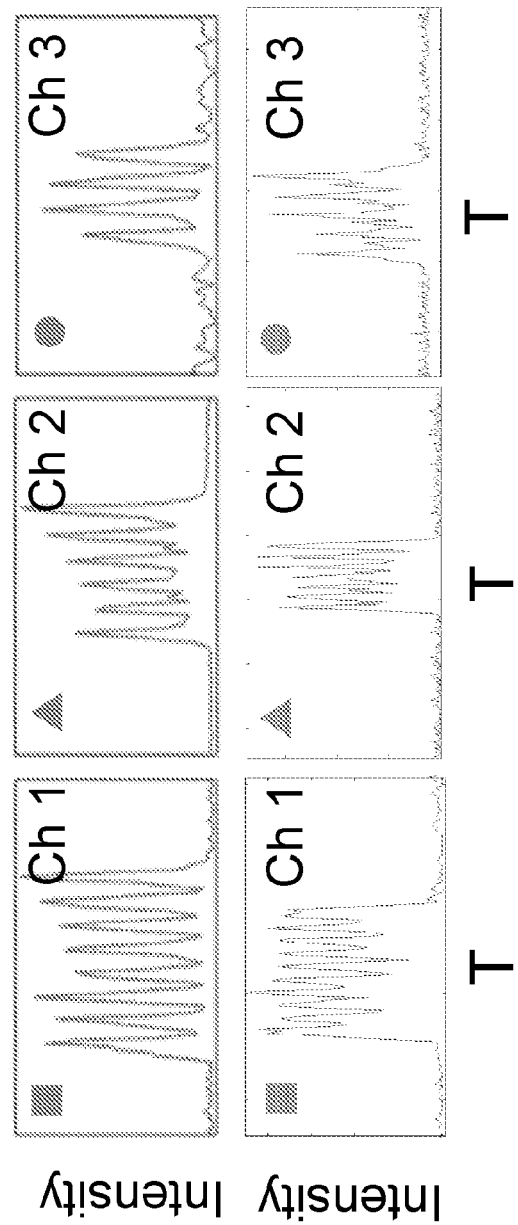

FIG. 3B shows the individual virus signals that were generated from H2N2 and H1N1 viruses, showing six distinct sets of peaks (sets of eight peaks, six peaks, and four peaks for H2N2; and sets of ten peaks, seven peaks, and five peaks for H1N1), coming from 3 separate channels. Furthermore, the velocities and the concentrations of the sample were extracted by using the time difference between the peaks and the known spot spacing Δx. The average velocity was found to be 0.87 cm/sec and the concentration was estimated to be 6×10⁵ particles/mL (by multiplying the number of peaks with cross-section area and velocity), which is in at the range of clinically relevant concentrations.

Thus, in accordance with the example described above, joint (e.g., spatially and spectrally) multiplexed detection of influenza viruses can be implemented on an optofluidic platform comprising multiple liquid-core waveguides intersecting a single MMI waveguide. Successful detection of influenza viruses from each channel for two different strains may be achieved with single molecule detection sensitivity, and the different strains and different channels may be distinguished from one another based on observing the detected number of spots in the spot-pattern generated or using other signal processing techniques.

Example 2

Figure 4B:
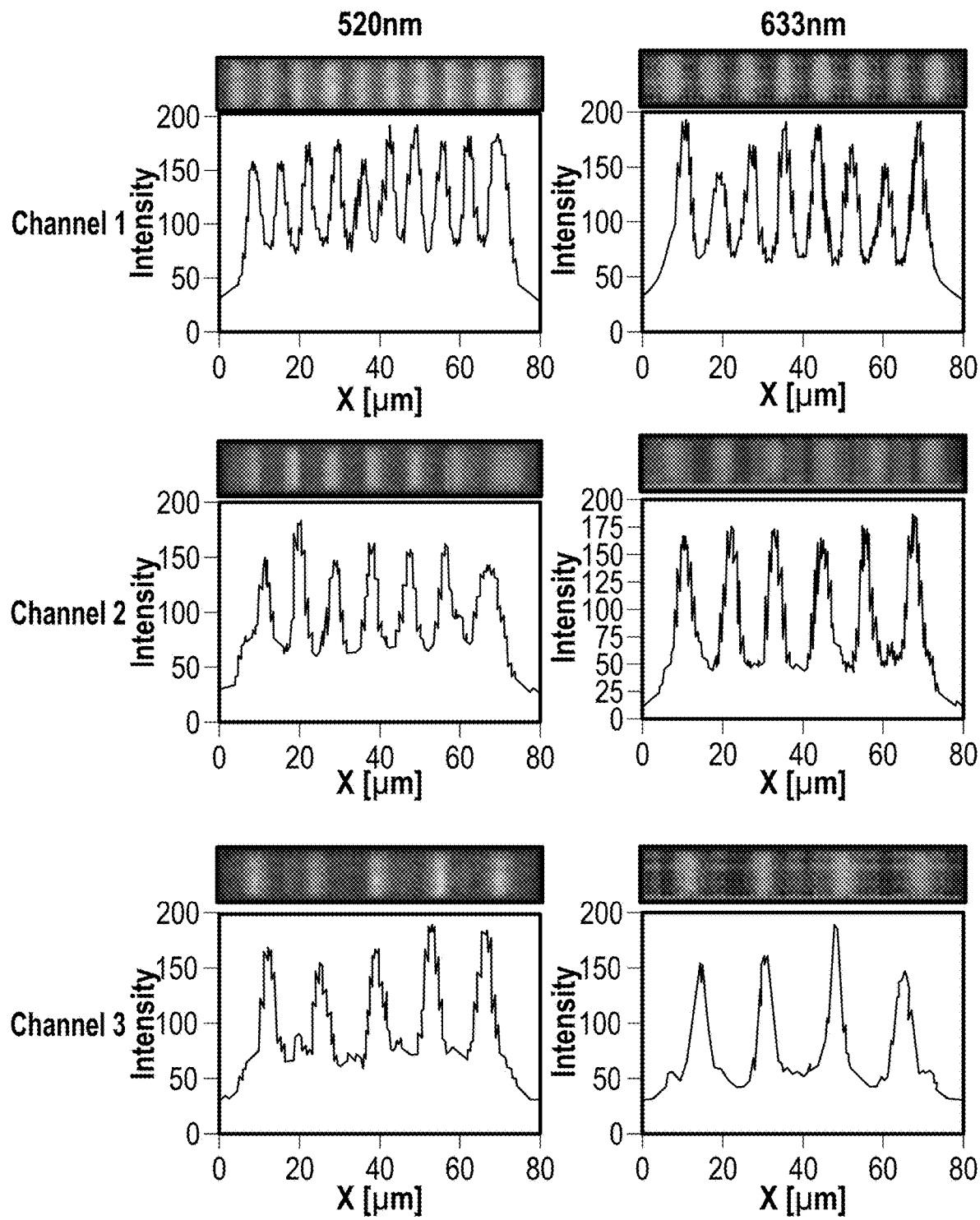

FIGS. 4A & 4B show another example of multiplex virus detection using three different analyte channels and two different wavelengths of light (520 nm and 633 nm) propagating through a single MMI waveguide, similar to the example of FIGS. 3A & 3B. FIG. 4A shows resulting fluorescence signals with different numbers of peaks, while FIG. 4B shows individual virus signals, showing six distinct sets of peaks (sets of eight peaks, six peaks, and four peaks for viruses excited by 633 nm light; and sets of ten peaks, seven peaks, and five peaks for viruses excited by 520 nm light), coming from 3 separate channels.

Cascaded MMI Waveguides for Distributed Spectral Multiplexing

As described above, dependent multi-spot excitation of analytes in capillaries and chip-based microchannels has recently been introduced and demonstrated as a powerful method to implement multiplex optical analysis of biomarkers and other targets. The principle is based on using an integrated optical element, for example a MMI waveguide to create a wavelength-dependent spot pattern in the channel through which the targets flow.

For best performance and sensitivity, the spot patterns should be as clean as possible with light only at the spot locations and little background in between. In addition, signals created by multiple excitation wavelengths should be easy to pick out with an appropriate signal processing algorithm. If a single MMI waveguide is used, inter-spot background may be non-zero, and collected fluorescence signals at different wavelengths may be of sufficiently different intensity to cause problems with color assignment.

Thus, the present disclosure describes systems, methods, and techniques for spectrally multiplexed detection of optically active targets in a microfluidic channel by a two-stage photonic structure that creates color-dependent excitation spot patterns that are spatially separated. As described below, the techniques disclosed herein may address the problem of using a single MMI waveguide and distinguishing colors from one another in spite of inter-spot background signal.

An inventive solution to the challenges described above is a multi-stage approach that features a first stage for spatial separation of light of different wavelengths (demultiplexing) and a second stage for using the demultiplexed light to create wavelength-dependent spot patterns in different parts of a capillary or channel. In some embodiments, an MMI waveguide may be used for the first (demultiplexing) stage. In some embodiments, other spectrally selective devices, such as an arrayed waveguide grating (AWG), may alternately or additionally be used.

Figure 5:
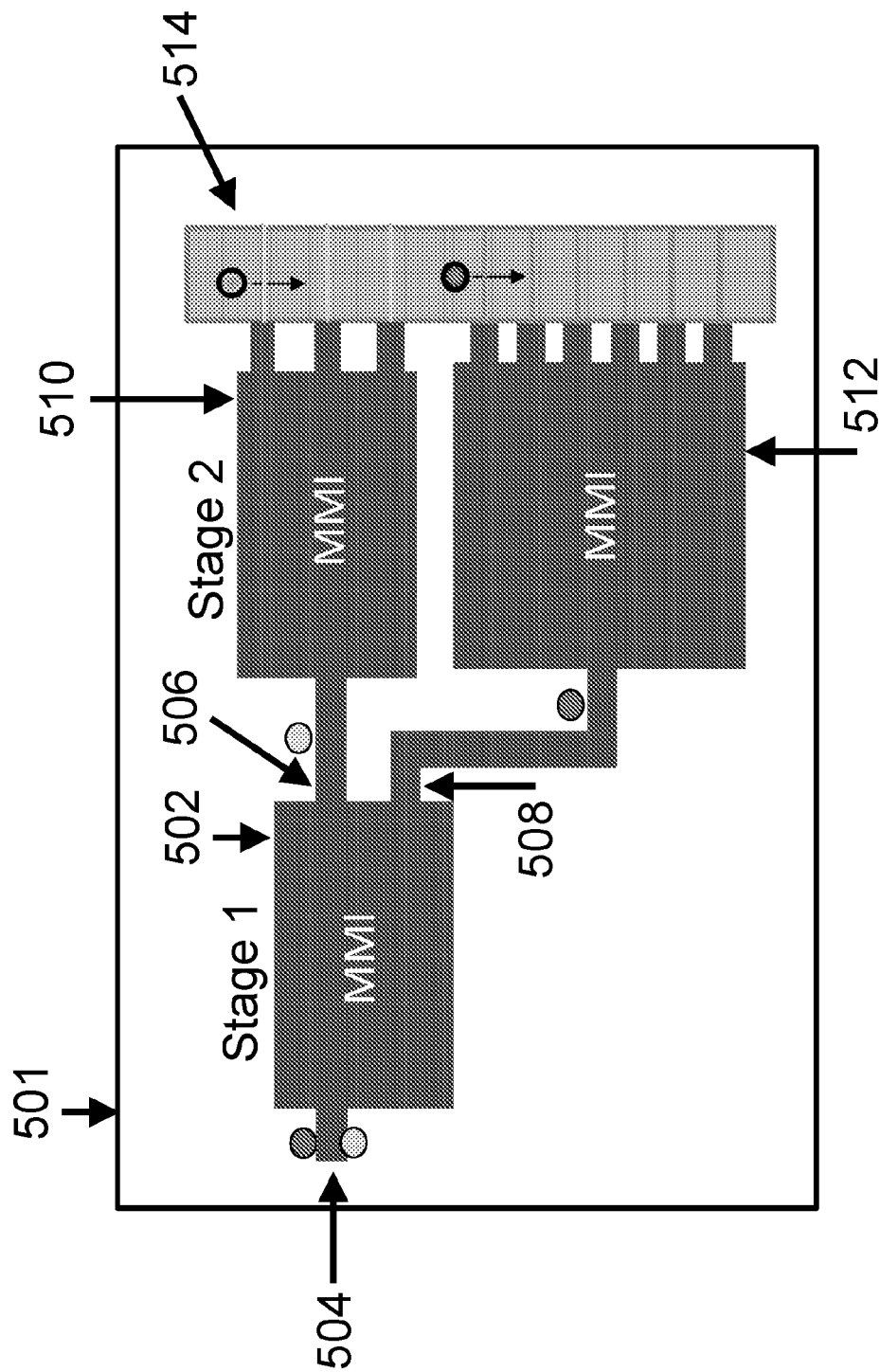
FIG. 5 depicts an MMI-based multi-stage multiplexing system, in accordance with some embodiments.

The first stage may use an MMI section with asymmetric (offset from center) input. This geometry may be used to create spatial switches and couplers (e.g. 1×2 switches or couplers and/or 2×2 switches or couplers). Here, the spectral dependence of light propagation may be relied on to achieve demultiplexing of light at different wavelengths. For an MMI waveguide with an asymmetric input (as shown in FIG. 5, for example) there will (for any wavelength) be a distance for which the input mode profile will be reproduced (self-image), but there will be another distance for which a mirror image will be created. The conditions for these images are:

| Self image | L = 3pL$_\pi$ | , with p even |
|---|---|---|
| Mirror image | L = 3qL$_\pi$ | , with q odd | and $$L_\pi = \frac{4n_c w^2}{3\lambda},$$

where $n_c$ is the effective index of the fundamental MMI waveguide mode, w is its effective width, and $\lambda$ is the wavelength.

When properly designed, the length and width of the MMI waveguide may be chosen such that two wavelengths incident through the same port will be spatially split into a self-image and a mirror image, respectively, thus demultiplexing the two wavelengths by spatially separating them from one another and causing them to be output from two spatially separated outputs (as shown for example in FIG. 5). The condition for this effect to occur is:

$$p\lambda_M = q\lambda_S$$

where $\lambda_M$ is the wavelength that produces a self-image, and $\lambda_S$ is the wavelength that produces a mirror image.

After spatial separation of the input colors in the first stage, a second stage may be used to create wavelength-dependent spot patterns incident on a channel, such as a liquid-core channel configured to contain analytes to be excited by the light of the spot patterns incident on the channel. In some embodiments, the second stage may comprise a plurality of MMI waveguides configured to each accept one wavelength of the demultiplexed light from the first stage. Each MMI waveguide in the second stage may be optimized to produce a single-color spot pattern with desired spot number N and spacing in the channel according to $$N = \frac{n_c w^2}{L\lambda}$$

where L is the length of a second-stage MMI section. In some embodiments, the second-stage MMI waveguides may be interfaced directly with the crossing channel and/or with a short section of single-mode waveguide that may connect the MMI waveguide output to the crossing channel (as shown, for example, in FIG. 5). In some embodiments, using short sections of single-mode waveguides to guide output light from second-stage MMI waveguides to the crossing channel may produce cleaner excitation signals with reduced inter-spot background in the crossing channel; in some embodiments, the number and spacing of short sections of single-mode waveguides may match the number and spacing of spots in the spot pattern output from the corresponding MMI waveguide.

One example of an embodiment using an MMI-based multi-stage multiplexing is shown by system 500 in FIG. 5. The first stage may comprise an MMI waveguide 502 designed to produce a self-image for one color (in the example shown, yellow, as represented by the lighter-colored dots) and a mirror image for a second color (in the example shown, red, as represented by the darker-colored dots) entering a first MMI waveguide through a single, off-center input 504.

As shown, MMI waveguide 502 may comprise a single, off-center input 504, which may be an optical port configured to receive input light of a plurality of wavelengths and to couple the light into the waveguide. Input 504 may be disposed at a first end of MMI waveguide 502 in the direction of propagation of light through the MMI waveguide, and may be off-center from the center of MMI waveguide 502 by an offset distance in a direction perpendicular to the direction of propagation of light through the MMI waveguide. In some embodiments, input 504 may be offset by greater than or equal to: 5%, 10%, 20%, 30%, 40%, or 45% of the width of the MMI waveguide in the offset direction. In some embodiments, input 504 may be offset by less than or equal to: 10%, 20%, 30%, 40%, or 45% of the width of the MMI waveguide in the offset direction.

As shown, MMI waveguide 502 may comprise off-center outputs 506 and 508, which may be optical ports configured to output light of one or more wavelengths from the MMI waveguide, for example by coupling the light into a single-mode waveguide. In some embodiments, output 506 may be aligned with input 504 in the offset direction and may be configured to output a self image of light entering through input 504. In some embodiments, output 508 may be offset from the center of MMI waveguide 504 by the same offset distance as input 504 in a direction opposite the offset of input 504, and may be configured to output a mirror image of light entering through input 504. In some embodiments, offset distances other than the offset distance of input port 504 may be used for one or more of outputs 506 and 508.

In some embodiments, a demultiplexing MMI waveguide such as MMI waveguide 502 may share any one or more characteristics in common with MMI waveguide 102 discussed above with respect to FIG. 1A, including material composition and size.

The outputs 506 and 508 may then be guided to a second stage (e.g., by one or more waveguides or other suitable optical elements), which may comprise two separate MMI waveguides 510 and 512. In some embodiments, each of the different colors of output light may be used, respectively, as input for one of the MMI waveguides in the second stage. One or more of the plurality of MMI waveguides in the second stage may each be configured to create a multi-spot pattern to be incident on an analyte channel 514. In some embodiments, MMI waveguides for the second stage may be designed and optimized independently of one another, including by having different sizes, compositions, output configurations, number of output ports/couplings, and the like. In some embodiments, MMI waveguides for creation of spot patterns incident on analyte channels such as MMI waveguides 510 and/or 512 may share any one or more characteristics in common with MMI waveguide 102 discussed above with respect to FIG. 1A, including material composition and size. In some embodiments, analyte channels such as analyte channel 514 may share any one or more characteristics in common with analyte channels 104, 106, and/or 108 discussed above with respect to FIG. 1A, including material composition, size, fluid contents, flow rate and control systems, etc.

In some embodiments, any one or more components of system 500 and/or associated systems may be disposed on a substrate 501, which may in some embodiments share any one or more characteristics in common with substrate 101 as described above with respect to FIG. 1A. In some embodiments, any one or more components of system 500 may be combined with any one or more components of the other systems, platforms, or devices described herein.

Figure 6A:
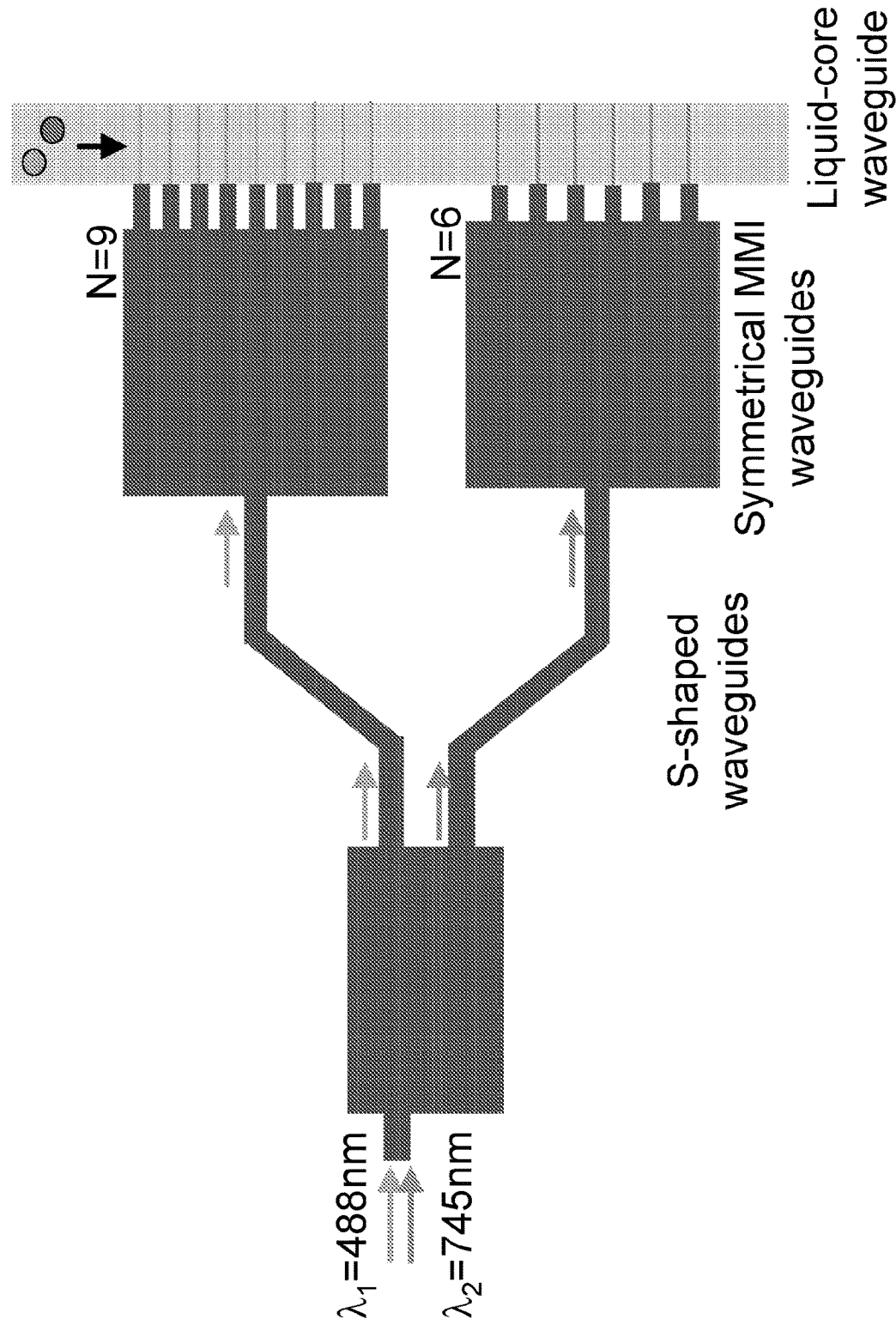
FIG. 6A an MMI-based multi-stage multiplexing system, in accordance with some embodiments.
Figure 6B:
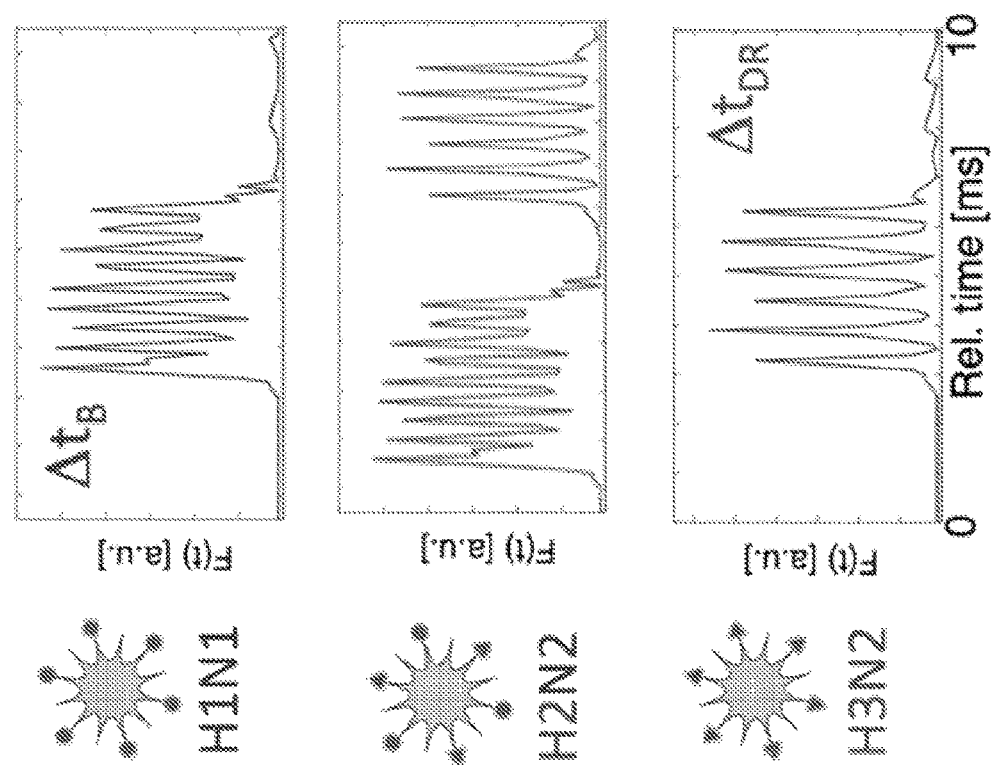

FIGS. 6A and 6B show a system 600 and simulated output signals for excitation of influenza viral particles labeled with different combinations of fluorophores and flowing through a liquid-core channel of a two-stage light-demultiplexing and particle-excitation system.

FIG. 6A depicts a two-stage system 600 for using a first-stage MMI waveguide to separate two different input wavelengths of 488 nm and 745 nm, each of which are input to the same off-center input. As shown, the 488 nm light is directed to the second-stage MMI waveguide 610 shown at the top of the figure, while the 745 nm light is directed to the second-stage MMI waveguide 612 shown at the bottom of the figure. Each of the second-stage MMI waveguides may be configured to separate the single-wavelength (or predominantly single-wavelength) input light into a spot pattern, such as spot patterns having nine spots or six spots, as shown. In the example of FIG. 6A, S-shaped waveguides 616a and 616b are used to guide light from the first-stage MMI waveguide 602 to each of the two second-stage MMI waveguides 610 and 612. In some embodiments, S-shaped waveguides 616a and 616b may be single-mode waveguides.

FIG. 6B depicts various simulated optical signals created by two-stage MMI waveguide excitation of particles flowing through a liquid-core channel and labeled with different combinations of fluorophores, such as excitation by the two-stage system shown in FIG. 6A. As shown, the resulting temporal signals in FIG. 6B may include a signal showing H1N1 excited by a nine-spot pattern, H3N3, illuminated by a six-spot pattern, and H2N2 illuminated by both the nine-spot pattern and the six-spot pattern. As shown in the signal corresponding to H2N2, the signal corresponding to the nine-spot pattern in one color is temporally separated from the signal corresponding to the six-spot pattern in another color, due to the fact that the MMI waveguides associated with each pattern are spatially separated from one another along the analyte channel, so the particles may flow past each MMI waveguide at a different point in time, one after the other. This separation may, in some embodiments, allow for cleaner and easier distinction of mixed signals.

In some embodiments, system 600 and its components may share any one or more characteristics in common with system 500 and its corresponding components as described above with respect to FIG. 5. In some embodiments, any one or more components of system 600 may be combined with any one or more components of the other systems, platforms, or devices described herein.

In some embodiments, spot patterns may be created by alternate or additional devices and/or techniques in the second stage. For example, FIG. 7 shows an implementation using system 700 comprising a plurality of single-mode waveguides to create a desired number of spots with different spacing.

Figure 7:
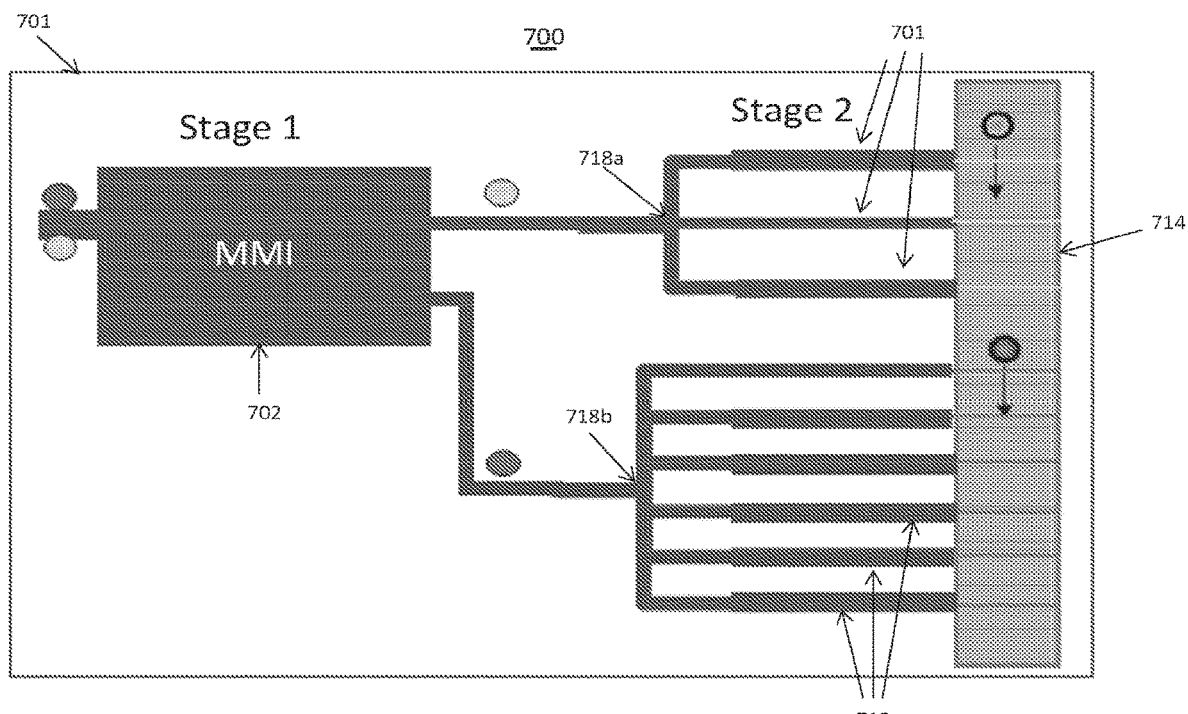
FIG. 7 depicts an MMI-based and single-mode-waveguide-based multi-stage multiplexing system, in accordance with some embodiments.

FIG. 7 depicts an MMI-based multi-stage multiplexing system 700, in accordance with some embodiments. In the system shown in FIG. 7, output light from a first MMI waveguide 702 may be guided to and used as input for a second stage that creates multi-spot patterns to be incident on a channel by using multiple single-mode waveguides whose number, length, and spacing can be designed and optimized independently. In the example shown, the second stage comprises single-mode waveguides 710, which is a set of three single-mode waveguides; and single-mode waveguides 712, which is a set of six single-mode waveguides. As shown, a plurality of single-mode waveguides may be configured to receive light from the same input source (e.g., MMI waveguide 702) via one or more optical splitters 718a and 718b (e.g., y-splitters) or the like. Thus, in some embodiments, simple single-mode waveguides (e.g., splitters) may be used to create spot-patterns to be incident on an analyte channel (e.g., channel 714) for particle excitation, rather than relying on MMI waveguides in the second stage to create spot-patterns from a single wavelength of light. It should be noted that, while using MMI waveguides in the second stage may create spot patterns in which the spots are evenly spaced from one another, one or more single-mode waveguides may be easily configured to create spot patterns in which the spots are irregularly spaced from one another, as the spacing of the spots from one another may not need to be in accordance with the spacing of any high-order, multi-spot mode.

In some embodiments, system 700 and its components may share any one or more characteristics in common with system 500 and its corresponding components or with system 600 and its corresponding components, as described above with respect to FIGS. 5 & 6 respectively. In some embodiments, any one or more components of system 600 may be combined with any one or more components of the other systems, platforms, or devices described herein.

Wavelength Multiplexing and Demultiplexing Using MMI Waveguides

As described above, optical multiplexing and demultiplexing may be an important component of photonic systems, such as optical communications systems or integrated biosensors. However, certain known waveguide-based methods for optical multiplexing and/or demultiplexing, such as using AWG's, may not be ideal, for example if curved waveguides are desired to be avoided, if the wavelengths under consideration are relatively widely spaced, and/or if the intended application is multiplex detection of fluorescence using commercially available dyes in the visible range (e.g., visible-range dyes may be widely spaced from one another).

Thus, described herein are systems, methods, and techniques for spatially optical multiplexing and demultiplexing using a MMI waveguides, which may address the above-noted shortcomings of known methods.

In some embodiments, photonic multiplexing and/or demultiplexing on a chip may be achieved via the use of one or more MMI waveguides. MMI waveguides may create varying spatial patterns perpendicular to the light propagation direction.

Figure 8A:
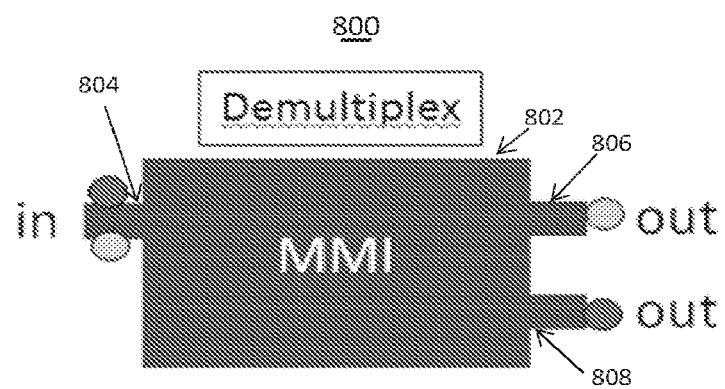
FIG. 8A depicts demultiplexing using an MMI waveguide, in accordance with some embodiments.

As described above, this effect may be used to create spatial switches and couplers (e.g. 1×2 switches or couplers and/or 2×2 switches or couplers). Here, the spectral dependence of light propagation may be relied on to achieve demultiplexing of light at different wavelengths. For an MMI waveguide with an asymmetric input (as shown in FIG. 8A, for example) there will (for any wavelength) be a distance for which the input mode profile will be reproduced (self-image), but there will be another distance for which a mirror image will be created. The conditions for these images are:

| Self image | $L = 3pL_\pi$ | , with p even |
|---|---|---|
| Mirror image | $L = 3qL_\pi$ | , with q odd | and $$L_\pi = \frac{4n_c w^2}{3\lambda},$$

where $n_c$ is the effective index of the fundamental MMI waveguide mode, w is its effective width, and $\lambda$ is the wavelength.

When properly designed, the length and width of the MMI waveguide may be chosen such that two wavelengths incident through the same port will be spatially split into a self-image and a mirror image, respectively, thus demultiplexing the two wavelengths by spatially separating them from one another and causing them to be output from two spatially separated outputs (as shown for example in FIG. 8A). The condition for this effect to occur is:

$$p\lambda_M = q\lambda_S$$

where $\lambda M$ is the wavelength that produces a self-image, and $\lambda S$ is the wavelength that produces a mirror image.

Figure 8B:
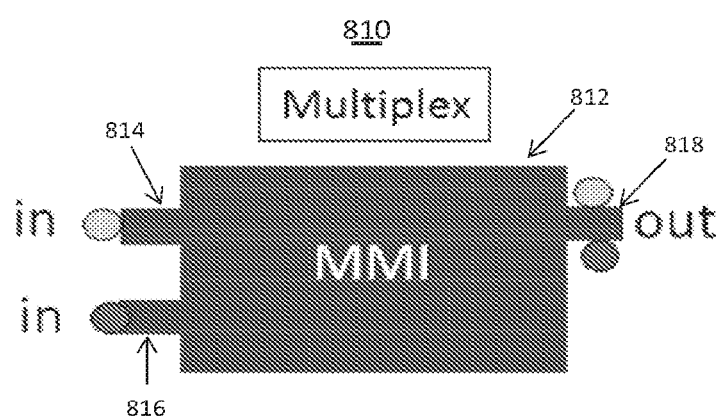
FIG. 8B depicts multiplexing using an MMI waveguide, in accordance with some embodiments.

In some embodiments, using an MMI waveguide in an operation that is the reverse of the demultiplexing described above may result in spectral multiplexing (shown, for example, in FIG. 8B). For example, if two light beams of two different wavelengths are indicent into two spaced-apart inputs of a single MMI waveguide, respectively then there may be a distance along MMI waveguide in the direction of propagation at which the two light beams are combined into a single, multiplexed light beam that may be output from a single (e.g., off-center) output from the MMI waveguide.

Examples of demultiplexing and multiplexing light using MMI waveguides are shown in FIGS. 8A-8F and FIG. 9.

FIG. 8A depicts system 800 for demultiplexing using an MMI waveguide 802, wherein the MMI waveguide 802 is designed to produce a self-image for one color (here, the lighter dots represent yellow light) and a mirror image for a second color (here, the darker dots represent red light) entering the MMI waveguide 802 through a single off-center input 804. As shown, the produced mirror image and the self-image may be output from the MMI waveguide via spatially-separated output ports 806 and 808 that are mirrors of one another.

In some embodiments, system 800, MMI waveguide 802 and any one or more of their components may share any one or more characteristics in common with system 500, MMI waveguide 502, and their corresponding components described above with respect to FIG. 5 including material composition and size. In some embodiments, any one or more components of system 800 may be combined with any one or more components of the other systems, platforms, or devices described herein.

FIG. 8B depicts system 810 for multiplexing via a reversal of the arrangement shown in FIG. 8A. In some embodiments, system 810 may be equivalent to system 800 with the exception that it is reversed with respect to the direction of propagation of light through the MMI waveguide. That is, an MMI waveguide 812 is designed to produce a self-image for one color (e.g., yellow) and mirror image for a second color (e.g., red) entering MMI waveguide through different off-center inputs 814 and 816 that are mirror images of each other. As shown, while each wavelength of light may enter the MMI waveguide through spatially separated input ports 814 and 816 that are mirrors of one another, the produced mirror image and the self-image may be output from the MMI waveguide via a single output port 818 that is aligned with one of the input ports (814) and is a mirror of the other (816).

In some embodiments, system 810, MMI waveguide 812 and any one or more of their components may share any one or more characteristics in common with system 800, MMI waveguide 802, and their corresponding components described above with respect to FIG. 8A; or with system 500, MMI waveguide 502, and their corresponding components described above with respect to FIG. 5 including material composition and size. In some embodiments, any one or more components of system 810 may be combined with any one or more components of the other systems, platforms, or devices described herein.

In some embodiments, demultiplexing MMI waveguides such as MMI waveguide 802 and multiplexing MMI waveguides such as MMI waveguide 812 may be arranged in series with one another (in any suitable order) to separate and then recombine different wavelengths of light and/or to combine and then re-separate different wavelengths of light. In some embodiments, demultiplexing and/or multiplexing MMI waveguides arranged in series with one another may be disposed on the same substrate and/or chip.

Figure 8C:
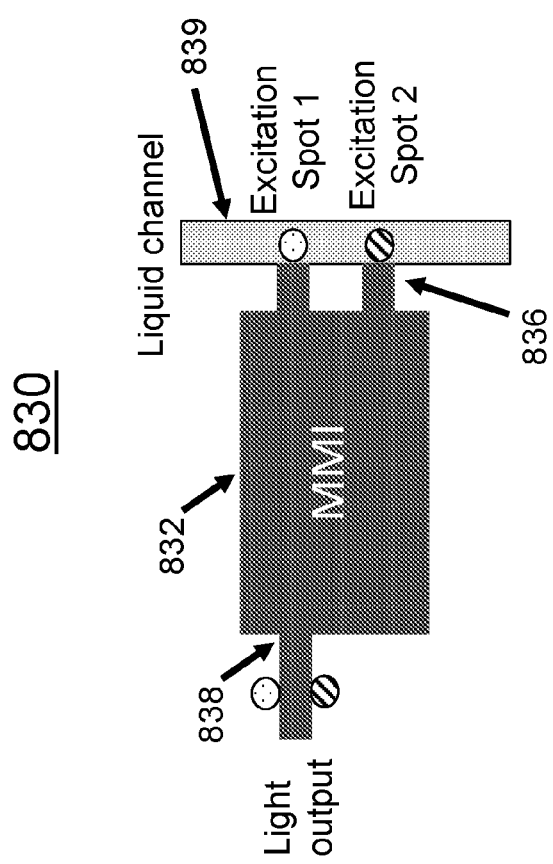
FIGS. 8C and 8D depict systems for using multiplexing or demultiplexing MMI waveguides for collection of signals from an analyte channel, in accordance with some embodiments.
Figure 8D:
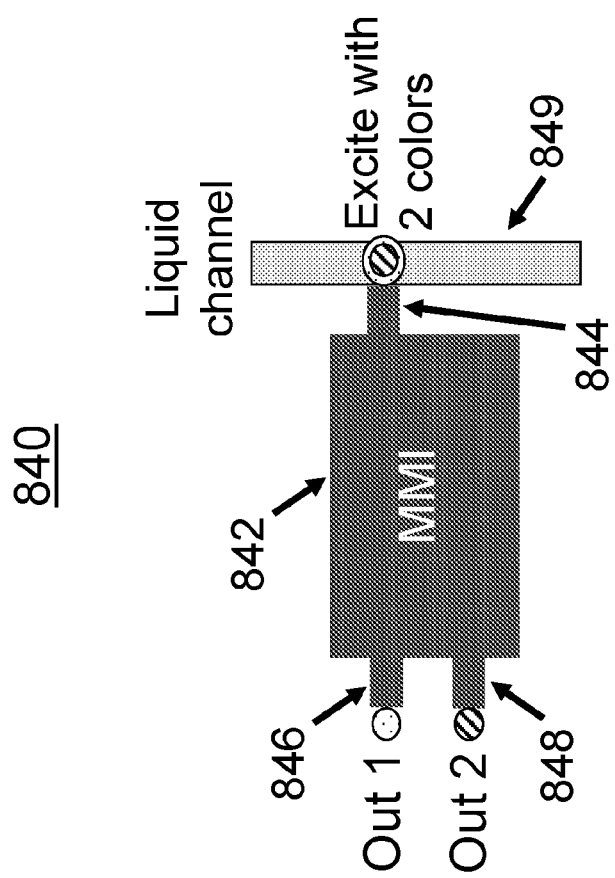

FIGS. 8C and 8D depict systems for using multiplexing or demultiplexing MMI waveguides for collection of signals from an analyte channel.

FIG. 8C depicts system 830 for multiplexing two different emission signals received from a first excitation spot and a second excitation spot of a single analyte channel. As shown, analyte channel 839 may contain analytes generating emission signals (e.g., fluorescence output light) at a first excitation spot at a first wavelength and at a second excitation spot at a different position along analyte channel 839 and at a second wavelength. Each of the excitation spots may be aligned with a respective one of a plurality of off-center inputs (one of inputs 834 and 836) to collect the emission signals into MMI waveguide 832. As the collected emission signals propagate from right to left in MMI waveguide 832, MMI waveguide 832 may multiplex the two emission signals to create a self image of the light from input 834 and a mirror image of the light from input 836, both of which may be output from MMI waveguide 832 by the single output 838.

In some embodiments, system 830 may be configured such that excitation light for exciting particles at one or both excitation spots may be incident on analyte channel 839 from overhead, from beside analyte channel 839, and/or from along analyte channel 839. In some embodiments, dimensions of MMI waveguide 832 may be selected in accordance with emission wavelengths of particles in analyte channel 839, so as to correctly multiplex the emission signals.

In some embodiments, system 830 may share any one or more characteristics in common with system 810 described above with respect to FIG. 8B, except that the light input to the MMI waveguide may come from emission signals from an analyte channel. In some embodiments, system 830, MMI waveguide 832 and any one or more of their components may share any one or more characteristics, including material composition and size, in common with any one or more other MMI waveguides and associated systems, including multiplexing and/or demultiplexing MMI waveguides and associated systems, described elsewhere herein. In some embodiments, any one or more components of system 830 may be combined with any one or more components of the other systems, platforms, or devices described herein.

FIG. 8D depicts system 840 for demultiplexing two different emission signals received from a single excitation spot of an analyte channel. As shown, analyte channel 849 may contain analytes generating multiple emission signals (e.g., fluorescence output light) at a single excitation spot at a first wavelength and at a second wavelength. The single excitation spot may be aligned with a single off-center input 844 to collect the emission signals into MMI waveguide 842. As the collected emission signals propagate from right to left in MMI waveguide 842, MMI waveguide 842 may demultiplex the two emission signals to create a self image of the light of one wavelength and a mirror image of the light of the other wavelength, directing the self image to output 846 and the mirror image to output 848.

In some embodiments, system 840 may be configured such that excitation light for exciting particles at the excitation spot may be incident on analyte channel 849 from overhead, from beside analyte channel 849, and/or from along analyte channel 849. In some embodiments, dimensions of MMI waveguide 842 may be selected in accordance with emission wavelengths of particles in analyte channel 849, so as to correctly demultiplex the emission signals.

In some embodiments, system 840 may share any one or more characteristics in common with system 800 described above with respect to FIG. 8A, except that the light input to the MMI waveguide may come from emission signals from an analyte channel. In some embodiments, system 840, MMI waveguide 842 and any one or more of their components may share any one or more characteristics, including material composition and size, in common with any one or more other MMI waveguides and associated systems, including multiplexing and/or demultiplexing MMI waveguides and associated systems, described elsewhere herein. In some embodiments, any one or more components of system 840 may be combined with any one or more components of the other systems, platforms, or devices described herein.

Figure 8E:
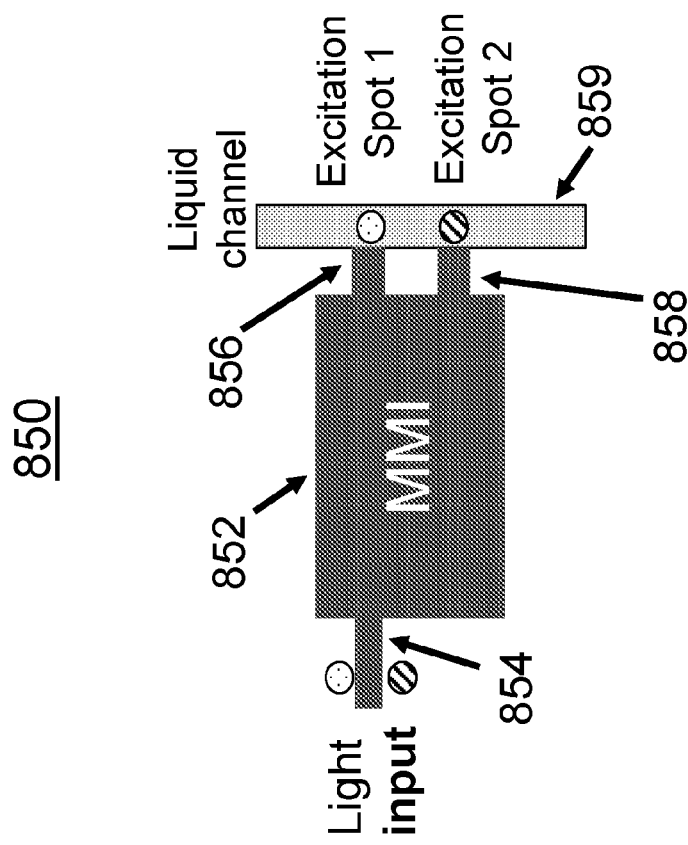
FIG. 8E and FIG. 8F depict systems for using multiplexing or demultiplexing MMI waveguides for delivery of excitation light to one or more analyte channels, in accordance with some embodiments.
Figure 8F:
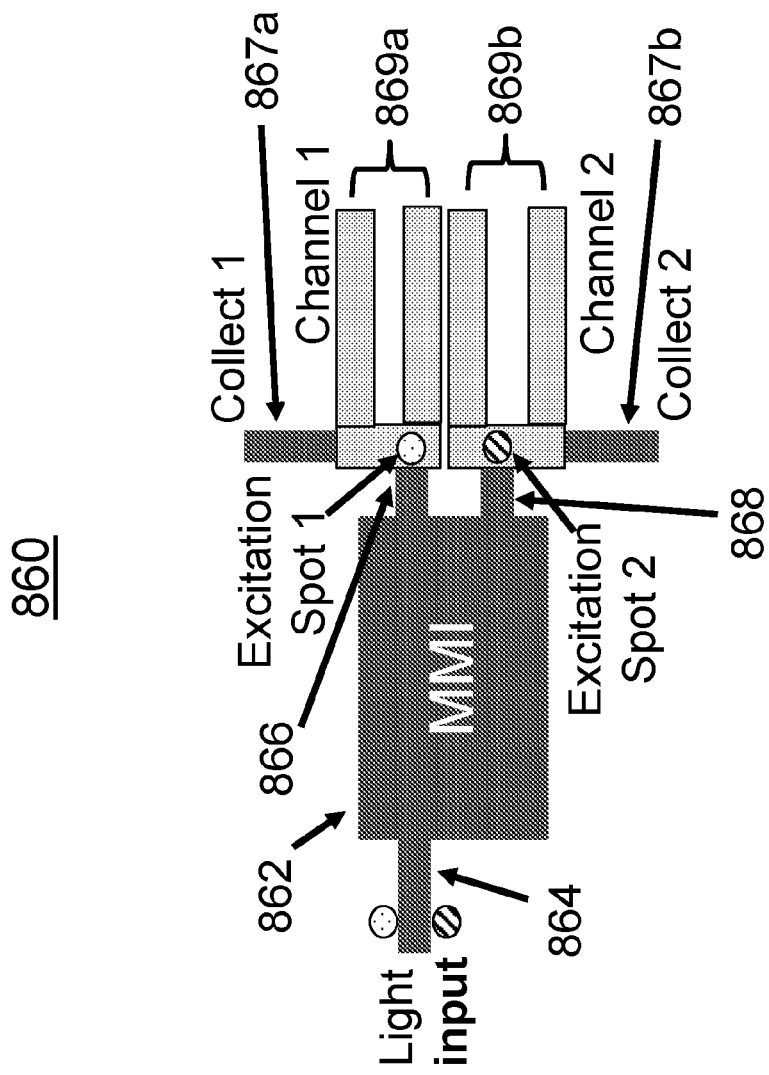

FIG. 8E and FIG. 8F depict systems for using multiplexing or demultiplexing MMI waveguides for delivery of excitation light to one or more analyte channels.

FIG. 8E depicts system 850 for demultiplexing two different wavelengths of excitation light for delivery to two excitation spots of an analyte channel. As shown, MMI 852 may be configured to receive input excitation light of two different wavelengths at input 854, and may be configured to demultiplex the two wavelengths of light to generate a self image of light of the first wavelength at output 856 and a mirror image of light of the second wavelength at output 858. Output 856 may direct the light of the first wavelength onto analyte channel 859 at a first location to generate a first excitation spot, while output 858 may direct the light of the second wavelength onto analyte channel 859 at a second location to generate a second excitation spot. In some embodiments, rather than being directed directly onto an analyte channel, light output from output 856 and/or 858 may be passed through one or more intermediate waveguides, splitters, and/or MMI waveguides, for example to create one or more multi-spot patterns from a single output signal.

In some embodiments, system 850 may be configured such that emission light (e.g., fluorescence output signals) may be collected from overhead analyte channel 859, from beside analyte channel 859, and/or from along analyte channel 859. In some embodiments, dimensions of MMI waveguide 852 may be selected in accordance with excitation wavelengths of particles in analyte channel 859, so as to correctly demultiplex the excitation signals.

In some embodiments, system 850 may share any one or more characteristics in common with system 800 described above with respect to FIG. 8A, except that the demultiplexed light output from the MMI waveguide may be directed onto an analyte channel. In some embodiments, system 850, MMI waveguide 852 and any one or more of their components may share any one or more characteristics, including material composition and size, in common with any one or more other MMI waveguides and associated systems, including multiplexing and/or demultiplexing MMI waveguides and associated systems, described elsewhere herein. In some embodiments, any one or more components of system 850 may be combined with any one or more components of the other systems, platforms, or devices described herein.

FIG. 8F depicts system 860 for demultiplexing two different wavelengths of excitation light for delivery to two excitation spots incident on separate analyte channels. As shown, MMI 862 may be configured to receive input excitation light of two different wavelengths at input 854, and may be configured to demultiplex the two wavelengths of light to generate a self image of light of the first wavelength at output 866 and a mirror image of light of the second wavelength at output 868. Output 866 may direct the light of the first wavelength onto analyte channel 869a at a first location to generate a first excitation spot, while output 868 may direct the light of the second wavelength onto analyte channel 869b at a second location to generate a second excitation spot.

In some embodiments, rather than being directed directly onto one or more analyte channels, light output from output 866 and/or 868 may be passed through one or more intermediate waveguides, splitters, and/or MMI waveguides, for example to create one or more multi-spot patterns from a single output signal.

In some embodiments, system 860 may be configured such that emission light (e.g., fluorescence output signals) may be collected from overhead analyte channels 869a and 869b, from beside analyte channels 869a and 869b, and/or from along analyte channels 869a and 869b. As shown, system 860 may comprise emission signal collection waveguides 867a and 867b, which may be disposed in-plane with MMI 862 and/or analyte channels 869a and 869b and may be configured to collect emission signals generated from within analyte channels 869a and 869b, respectively. In some embodiments, dimensions of MMI waveguide 862 may be selected in accordance with excitation wavelengths of particles in analyte channels 869a and 869b, so as to correctly demultiplex the excitation signals.

In some embodiments, system 860 may share any one or more characteristics in common with system 800 described above with respect to FIG. 8A, except that the demultiplexed light output from the MMI waveguide may be directed onto one or more analyte channels. In some embodiments, system 860, MMI waveguide 862 and any one or more of their components may share any one or more characteristics, including material composition and size, in common with any one or more other MMI waveguides and associated systems, including multiplexing and/or demultiplexing MMI waveguides and associated systems, described elsewhere herein. In some embodiments, any one or more components of system 860 may be combined with any one or more components of the other systems, platforms, or devices described herein.

Figure 9:
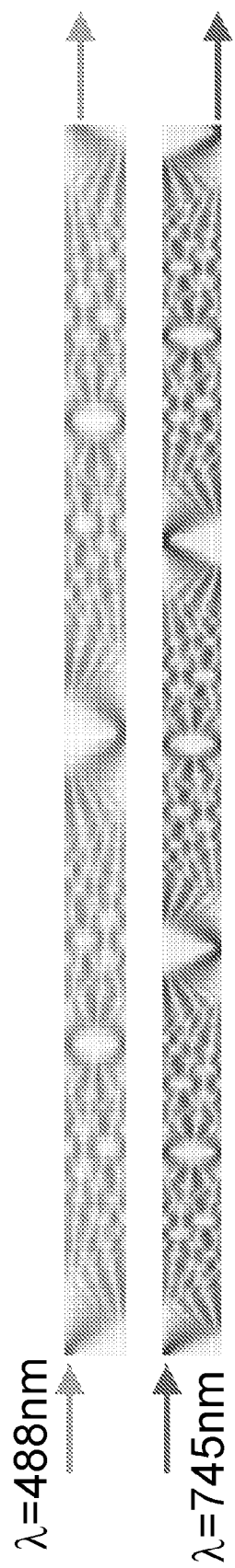
FIG. 9 depicts MMI-based propagation of light for two different wavelengths in a manner that may be used for demultiplexing, in accordance with some embodiments.

FIG. 9 depicts a simulation showing an MMI-based demultiplexing principle for two specific colors. The top of FIG. 9 shows a representation of an MMI waveguide with blue light (488 nm) propagating from left to right. As shown, the blue light enters the MMI waveguide through an off-center input port at the upper edge of the left side, and propagates to create a self-image at the right side of the MMI waveguide, where it may exit through an off-center output port at the upper edge of the right side.

The bottom of FIG. 9, on the other hand, shows a representation of an MMI waveguide with red light (745 nm) propagating from left to right. As shown, the red light enters the MMI waveguide through an off-center input port at the upper edge of the left side, and propagates to create a mirror-image at the right side of the MMI waveguide, where it may exit through an off-center output port at the lower edge of the right side.

In some embodiments, a single MMI waveguide may be used to propagate both the red light shown and the blue light shown, such that light of both wavelengths may enter the MMI waveguide through the same input port (e.g., upper edge of the left side), and the wavelengths may be demultiplexed such that the blue light exits through one output port (e.g., upper edge of the right side) and the red light exits through another output port (e.g., lower edge of the right side), where both output ports are located the same distance in the direction of propagation from the single input port.

In some embodiments, the multiplexing/demultiplexing principle for two specific wavelengths $\lambda_B$ and $\lambda_C$ may be shown as:

$$p\left(\frac{4n_c w^2}{\lambda_B}\right) = q\left(\frac{4n_c w^2}{\lambda_B}\right)$$

In some embodiments, for multiplexing (including remultiplexing previously demultiplexed light), an arrangement in the reverse of FIG. 9 may be used, with the red and blue light entering a single MMI waveguide through two different off-center ports at the right side of the MMI waveguide and propagating right to left to exit the MMI waveguide through a single off-center port at the left side of the MMI waveguide.

Tunable Liquid-Core MMI Waveguides for Spectral, Spatial, and Spectral-Spatial Multiplex Detection As explained above, MMI waveguides may be used for spectrally dependent multi-spot excitation of analytes in capillaries as a powerful tool for multiplex optical analysis of biomarkers and other targets. However, MMI waveguides made from solid materials may produce imperfect spot patterns, due to inhomogeneity in the refractive index of the solid MMI waveguide material. Furthermore, the best pattern may be shifted from the desired wavelength due to index variations or small changes in dimensions, both as results of a complementary metal-oxide-semiconductor microfabrication, microelectromechanical systems microfabrication, or the like.

The present disclosure describes systems, methods, and techniques for spectrally multiplexed detection of optically active targets in a microfluidic channel by using a liquid-core MMI waveguide that can be tuned by core index (e.g., by changing the liquid or temperature), pressure, or both. As explained herein, liquid-core, tunable MMI waveguides may address one or more of the problems with solid-core MMI waveguides discussed above, for example because liquid-core MMI waveguides may have fewer fabrication imperfections and/or may be finely tunable to compensate for fabrication imperfections.

In some embodiments, implementing liquid cores instead of solid cores for MMI waveguides may address one or more of the problems discussed above. In some embodiments, a core liquid for a LC-MMI waveguide may feature a more uniform refractive index than a solid core, and the spot-pattern generated by an LC-MMI waveguide may be easily and effectively tuned, such as by exchanging the core liquid (and thus changing the MMI waveguide core index), heating the core liquid, or changing the dimensions of the liquid core of the LC-MMI waveguide (e.g., in the case of using a flexible material for fabrication of the walls of the LC-MMI waveguide).

Figure 10A:
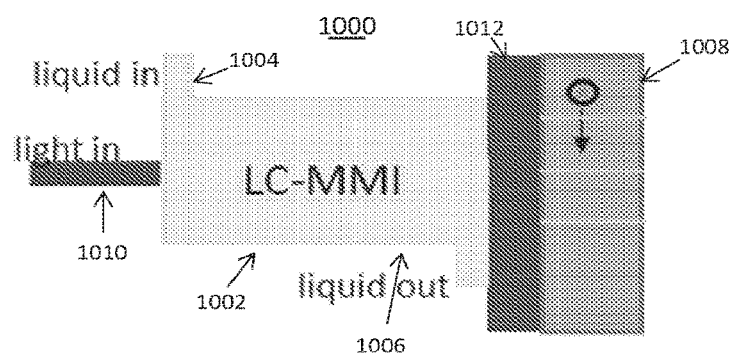
FIG. 10A depicts a liquid-core MMI (LC-MMI) waveguide for optofluidic multiplex detection, in accordance with some embodiments.

FIG. 10A depicts a LC-MMI waveguide system 1000 for optofluidic multiplex detection. FIG. 10A shows a top-down view of a LC-MMI section 1002 producing a tunable spot pattern (having three spots, in the example shown) incident on an intersecting fluidic channel 1008 that may contain one or more analytes to be excited by the spot pattern. As shown, LC-MMI section 1002 may be a section of an LC-MMI waveguide comprising a fluid inlet port 1004 and a fluid outlet port 1006, both fluidly connected to a hollow channel defined in the center of LC-MMI section 1002 and configured to allow the fluid/liquid inside LC-MMI section 1002 to be evacuated and exchanged for another liquid, such as another liquid having different optical properties such as a different index of refraction. By replacing the liquid inside LC-MMI section 1002 with another liquid having a different index of refraction, optical properties of LC-MMI waveguide system 1000 may accordingly be adjusted.

In some embodiments, LC-MMI waveguide section 1002 may be made from oxides such as SiO2, nitrides such as SiN, oxynitrides such as SiON, PDMS, plastics, and/or semiconductors. In some embodiments, the liquid or fluid inside LC-MMI waveguide section 1002 may comprise any one or more of the liquids or fluids mentioned above with respect to liquid-core waveguides 104, 106, or 108.

In some embodiments, a height of LC-MMI waveguide section 1002 may be greater than or equal to: 0.01 µm, 0.05 µm, 0.1 µm, 0.5 µm, 1 µm, 2 µm, 5 µm, 10 µm, 25 µm, or 50 µm. In some embodiments, a height of LC-MMI waveguide section 1002 may be less than or equal to: 0.01 µm, 0.05 µm, 0.1 µm, 0.5 µm, 1 µm, 2 µm, 5 µm, 10 µm, 25 µm, or 50 µm. In some embodiments, a height of LC-MMI waveguide section 1002 may be between 0.1 µm and 10 µm.

In some embodiments, a width of LC-MMI waveguide section 1002 may be greater than or equal to: 1 µm, 5 µm, 10 µm, 50 µm, 100 µm, 250 µm, 500 µm, 1 mm, or 2 mm. In some embodiments, a width of LC-MMI waveguide section 1002 may be less than or equal to: 1 µm, 5 µm, 10 µm, 50 µm, 100 µm, 250 µm, 500 µm, 1 mm, or 2 mm. In some embodiments, a width of LC-MMI waveguide section 1002 may be between 10 µm and 500 µm.

In some embodiments, a length of LC-MMI waveguide section 1002 may be greater than or equal to: 10 µm, 50 µm, 100 µm, 500 µm, 1 mm, 1 cm, 5 cm, 10 cm, or 20 cm. In some embodiments, a length of LC-MMI waveguide section 1002 may be less than or equal to: 10 µm, 50 µm, 100 µm, 500 µm, 1 mm, 1 cm, 5 cm, 10 cm, or 20 cm. In some embodiments, a length of LC-MMI waveguide section 1002 may be between 100 µm and 5 cm.

Note that the heights, widths, and lengths of LC-MMI waveguide section 1002 discussed above may pertain to the dimensions of the liquid core defining LC-MMI waveguide section 1002, rather than an outer surface of LC-MMI waveguide section 1002.

In some embodiments, light may be delivered to a LC-MMI waveguide by a single-mode waveguide (e.g., a solid-core, single-mode waveguide), such as single-mode waveguide 1010 shown in FIG. 10A. After coupling into the multiple, lateral modes of the wider MMI region 1002 of the LC-MMI system, the modes may interfere and produce a spot pattern with a spot number N after propagating a distance L determined by $$N = \frac{n_c w^2}{L\lambda} \quad (2)$$

where L is the length of the second stage MMI section, $n_c$ is the effective index of the fundamental MMI waveguide mode, w is its effective width, and $\lambda$ is the wavelength of propagating light. In an MMI waveguide composed of solid material (e.g. $SiO_2$) the only mechanism to tune the spot number is to change $\lambda$. However, if the MMI waveguide core is made from a liquid as with LC-MMI waveguides disclosed herein, other parameters in eqn. (2) can be adjusted after fabrication is complete, including at least $n_c$ and w.

The liquid for the MMI section may be supplied via inlets (e.g., inlet 1004) and outlets (e.g., outlet 1006) separate from an optical input. The MMI section 1002 may be separated from a second, intersecting fluidic channel 1008 that may contain analytes for optical analysis by a solid barrier 1012 through which the generated spot pattern may propagate. Particles flowing through the second channel may then be subjected to the spot pattern created according to eqn. (2), and they may produce a wavelength-characteristic optical signal that may be used for spectral identification.

In some embodiments, any one or more components of system 1000 may be combined with any one or more components of the other systems, platforms, or devices described herein.

Figure 10B:
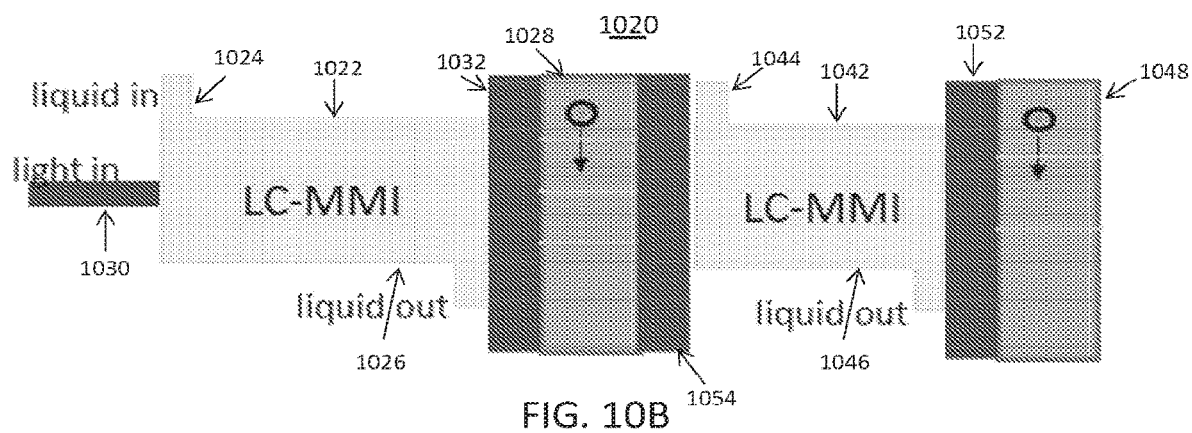
FIG. 10B depicts a plurality of LC-MMI waveguides arranged in series, in accordance with some embodiments.

FIG. 10B depicts system 1020 comprising a plurality of LC-MMI waveguides 1022 and 1042 arranged in series with one another, such that the spot-pattern output from first-stage LC-MMI waveguide 1022 may be used as an input for second-stage LC-MMI waveguide 1042, which may propagate the light further and create a different spot pattern (having two spots, in the example shown) attributable to a different mode as output from second LC-MMI waveguide 1042. As shown, the output from each LC-MMI waveguide (1022 and 1042) may be incident on an intersecting liquid-core analyte channel (1028 and 1048, respectively), where it may be used to excite one or more analytes in the channel. As shown, each LC-MMI segment in a multi-stage LC-MMI waveguide system such as system 1020 may have dedicated ports (here ports 1024/1026 and ports 1044/1046) for inserting and/or removing liquid into the LC-MMI waveguide, such that liquid in one or more of the LC-MMI segments may be replaced independently of the liquid in one or more other LC-MMI segments, allowing each of the LC-MMI segments to be independently tuned. Furthermore, in this way, spatial multiplexing by creating different spot numbers at the same wavelength in subsequent analyte channels is possible.

As shown, in system 1020, light may initially enter LC-MMI waveguide 1022 by single-mode waveguide 1030. As shown, intersecting analyte channels 1028 and 1048 may be separated from LC-MMI waveguides 1022 and/or 1042 by solid barriers 1032, 1052, and/or 1054. In some embodiments, LC-MMI waveguide 1042 and its associated components may share any one or more characteristics in common with LC-MMI waveguide 1022 and its corresponding associated components. In the example shown, LC-MMI waveguide 1042 may be shorter than LC-MMI waveguide 1022. In the example shown, LC-MMI waveguide 1022 may be configured to generate a spot pattern having three spots incident on channel 1028, and LC-MMI waveguide may then be configured to generate a spot pattern of the same wavelength having two spots incident on channel 1048.

In some embodiments, LC-MMI waveguide system 1020 and its components may share any one or more characteristics in common with LC-MMI waveguide system 1000 and its corresponding components described above with respect to FIG. 10A, including material composition, size, fluid contents, flow rate and control systems, etc. In some embodiments, any one or more components of system 1020 may be combined with any one or more components of the other systems, platforms, or devices described herein.

In some embodiments, if the liquid core of an LC-MMI waveguide is surrounded by solid, rigid materials, the only tuning options for the spot pattern may be via $\lambda$ and $n_c$ as seen from eqn. (2). However, in some embodiments, if the device is built from flexible material, e.g. PDMS, then w and L may also be adjustable. This concept is illustrated in FIGS. 11A-11G, in accordance with some embodiments.

Figure 11A:
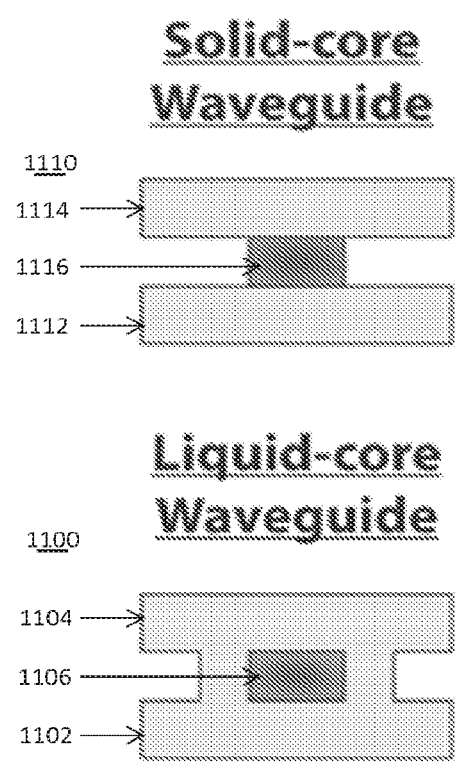
FIG. 11A depicts solid-core and liquid-core waveguides, in accordance with some embodiments.

FIG. 11A shows PDMS-based solid-core and liquid-core waveguides. FIGS. 11B-11F show exemplary implementation of a mechanically tunable LC-MMI waveguide on a PDMS chip made with soft lithography techniques, as well as the results of adjusting the spot pattern via flow speed of the central liquid and deformation of the membrane walls using mechanical pressure. FIG. 11G shows how this principle may be applied to creating tunable spot patterns when interfaced with a crossing analyte channel as described above.

FIG. 11A is an illustration of cross-sectional views of PDMS-based solid-core and liquid-core waveguides, in accordance with some embodiments.

FIG. 11A shows cross-sectional views of liquid-core waveguide 1100 and solid-core waveguide 1110. As shown, liquid-core waveguide 1100 may comprise bottom layer 1102 and top layer 1104, which may be PDMS layers having a first refractive index. Liquid-core waveguide 1100 may comprise liquid core 1106 in between layers 1102 and 1104; liquid core 1106 may comprise a hollow channel configured to be able to be filled with a liquid having a second refractive index. In some embodiments, one or both of layers 1102 and 1104 may be flexible, deformable, and/or movable, such that the dimensions of liquid-core 1106 located between layers 1102 and 1104 may be altered.

As shown, solid-core waveguide 1110 may comprise bottom layer 1112 and top layer 1114, which may be PDMS layers having a third refractive index. Solid-core waveguide 1110 may comprise solid core 1116 in between layers 1112 and 1114; solid core 1116 may comprise a PDMS layer or other layer configured to transmit light, the layer having a fourth refractive index. In some embodiments, one or both of layers 1112 and 1114 may be flexible, deformable, and/or movable, such that the position, dimensions, angle, strain, or one or more other properties of solid-core 1116 located between layers 1102 and 1104 may be altered. In some embodiments, lateral optical guiding may be ensured by surrounding solid core 1116 with air channels, resulting in low propagation losses.

Figure 11B:
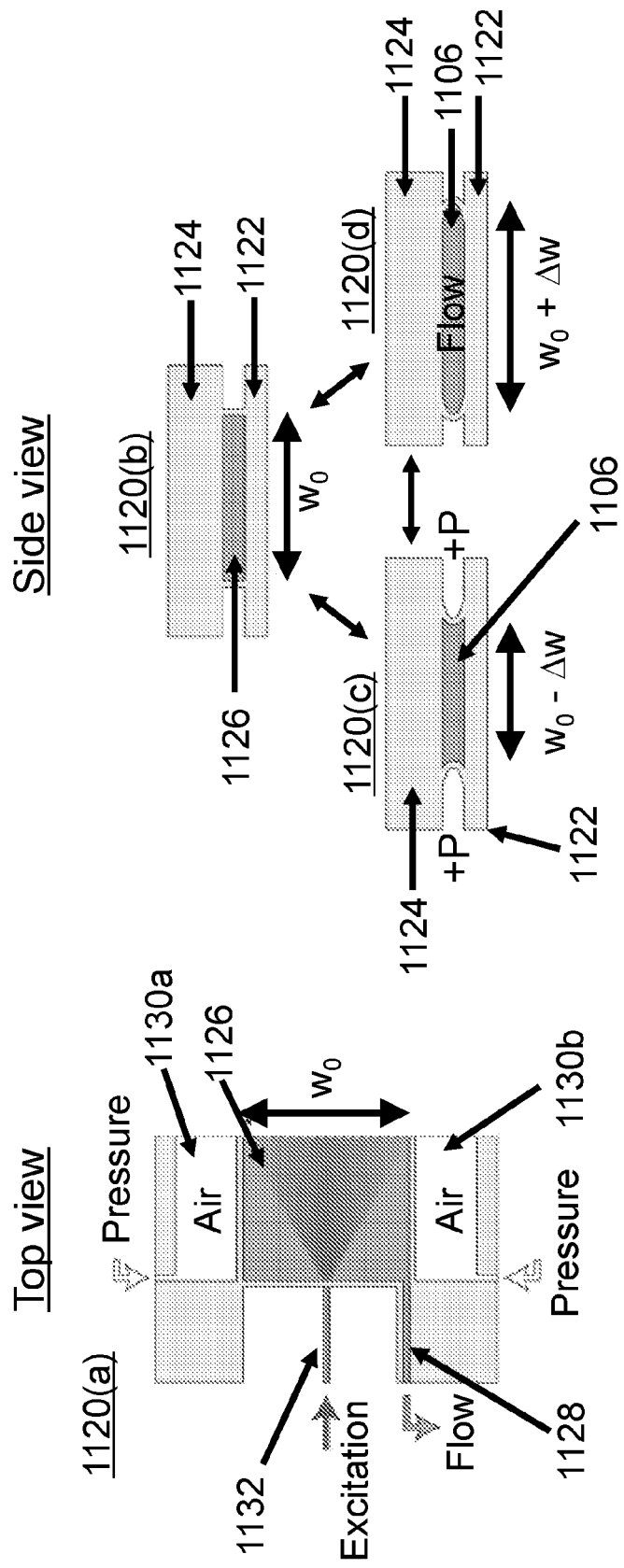
FIG. 11B depicts various views of a mechanically tunable LC-MMI waveguide, in accordance with some embodiments.

FIG. 11B depicts various views of an adjustable (e.g., mechanically tunable) LC-MMI waveguide 1120. LC-MMI waveguide 1120 is shown in a top view (1120(a)), a cross-sectional view in an unpressurized state (1120(b)), a cross-sectional view in an externally pressurized state (1120(c)), and a cross-sectional view in an internally pressurized state (1120(d)).

In some embodiments, fiber-injected laser light may propagate through an excitation solid-core waveguide and into a liquid-core of LC-MMI waveguide 1120. As shown in 1120(a) and 1120(b), the liquid core may have a static (e.g., unpressurized) width of $w_0$. In some embodiments, external air pressure may yield a decrease in liquid-core waveguide width, as shown in 1120(c), while liquid flow may increase waveguide width, as shown in 1120(d). In some embodiments, externally-applied negative pressure (e.g., vacuum force) may yield a decrease in liquid-core waveguide width similar to as shown in 1120(c), while internally-applied positive pressure (e.g., flowforce) may yield an increase in liquid-core waveguide width similar to as shown in 1120(d).

As shown, LC-MMI waveguide 1120 may comprise bottom layer 1122 and top layer 1124, which may be PDMS layers having a first refractive index. Liquid-core waveguide 1100 may comprise liquid core 1106 in between layers 1122 and 1124; liquid core 1126 may comprise a hollow channel bounded on the top and bottom by layers 1124 and 1122, respectively, and bounded on the sides by side walls, and configured to be able to be filled with a liquid having a second refractive index. In some embodiments, one or both of layers 1122 and 1124 may be flexible, deformable, and/or movable, such that the dimensions of liquid-core 1126 located between layers 1122 and 1124 may be altered. In some embodiments, side walls enclosing the hollow channel of liquid core 1126 may be flexible, deformable, and/or movable, such that the dimensions of liquid core 1126 may be altered as shown in views 1120(b)-1120(d).

As shown, LC-MMI waveguide 1120 may comprise fluid inlet/outlet port 1128, which may be a fluid port fluidly connected to the hollow channel of liquid core 1126 and configured to allow fluid/liquid to flow into and/or out of the hollow channel. In some embodiments, port 1128 may be used to evacuate and/or replace a fluid inside liquid core 1126. In some embodiments, port 1128 may be used to cause flow of fluid inside liquid core 1126. In some embodiments, port 1128 may be used to apply pressure to the fluid inside liquid core 1126 to cause the fluid to exert outward force on the top and/or side walls of the hollow channel, which may in some embodiments cause a change of width of liquid core 1126 as shown for example in view 1120(d).

As shown, LC-MMI waveguide 1120 may comprise pressurization chambers 1130a and 1130b, which may be disposed outside the side walls of liquid core 1126 and may be configured to be able to be positively (see, e.g., view 1120(c)) or negatively pressurized to exert force on the side walls of liquid core 1126 and to cause a change of width of liquid core 1126 as shown for example in view 1120(c). In some embodiments, pressurization chambers 1130a and/or 1130b may be pressurized with any suitable gas or fluid, such as air as shown in view 1120(a).

As shown, light may initially enter LC-MMI waveguide 1120 by single-mode waveguide 1132.

In some embodiments, LC-MMI waveguide 1120 and its associated components may share any one or more characteristics in common with LC-MMI waveguide 1002 and its corresponding associated components described above with respect to FIG. 10A, including material composition, size, fluid contents, flow rate and control systems, etc.

In some embodiments, the side walls of liquid-core 1126 may be made from PDMS. In some embodiments, the side walls of liquid-core 1126 may have a thickness of greater than or equal to: 0.1 µm, 0.25 µm, 0.5 µm, 1 µm, 5 µm, 10 µm, 20 µm, 30 µm, or 50 µm. In some embodiments, the side walls of liquid-core 1126 may have a thickness of less than or equal to: 0.1 µm, 0.25 µm, 0.5 µm, 1 µm, 5 µm, 10 µm, 20 µm, 30 µm, or 50 µm. In some embodiments, the side walls of liquid-core 1126 may have a thickness of between 0.5 µm and 20 µm.

In some embodiments, one or more of pressurization chambers 1130a and 1130b may have a height of greater than or equal to: 0.1 µm, 0.5 µm, 1 µm, 5 µm, 10 µm, 20 µm, 30 µm, or 50 µm. In some embodiments, one or more of pressurization chambers 1130a and 1130b may have a height of less than or equal to: 0.1 µm, 0.5 µm, 1 µm, 5 µm, 10 µm, 20 µm, 30 µm, or 50 µm. In some embodiments, one or more of pressurization chambers 1130a and 1130b may have a height of between 1 µm and 20 µm.

In some embodiments, one or more of pressurization chambers 1130a and 1130b may be configured to be pressurized to greater than or equal to: 0.1 psi, 0.5 psi, 1 psi, 5 psi, 10 psi, 25 psi, 50 psi, 100 psi, 150 psi, or 250 psi. In some embodiments, one or more of pressurization chambers 1130a and 1130b may be configured to be pressurized to less than or equal to: 0.1 psi, 0.5 psi, 1 psi, 5 psi, 10 psi, 25 psi, 50 psi, 100 psi, 150 psi, or 250 psi. In some embodiments, one or more of pressurization chambers 1130a and 1130b may be configured to be pressurized to between 1 psi and 100 psi.

In some embodiments, liquid core 1126 may be configured to allow fluid to flow at greater than or equal to: 0.1 µm/s, 0.5 µm/s, 1 µm/s, 10 µm/s, 100 µm/s, 1 mm/s, 1 cm/s, 10 cm/s, 1 m/s, 2 m/s, or 5 m/s. In some embodiments, liquid core 1126 may be configured to allow fluid to flow at less than or equal to: 0.1 µm/s, 0.5 µm/s, 1 µm/s, 10 µm/s, 100 µm/s, 1 mm/s, 1 cm/s, 10 cm/s, 1 m/s, 2 m/s, or 5 m/s. In some embodiments, liquid core 1126 may be configured to allow fluid to flow at between 1 µm/s and 1 m/s.

As shown, pressurization of chambers 1130a and/or 1130b, and/or flow of fluid inside core 1126, may cause a change in the width $w_0$ of liquid core 1126 by $+/-\Delta w$, such that $w=w_0+/-\Delta w$. In some embodiments, w may be greater than or equal to: 0.1%, 0.5%, 1%, 5%, 10%, 25%, 50%, 75%, 90%, 95%, 99%, 101%, 105%, 110%, 125%, 150%, 175%, 200%, 300%, or 500% of $w_0$. In some embodiments, w may be less than or equal to: 0.1%, 0.5%, 1%, 5%, 10%, 25%, 50%, 75%, 90%, 95%, 99%, 101%, 105%, 110%, 125%, 150%, 175%, 200%, 300%, or 500% of $w_0$.

In some embodiments, $\Delta w$ may be greater than or equal to: 0.01 µm, 0.05 µm, 0.1 µm, 0.5 µm, 1 µm, 5 µm, 10 µm, 20 µm, or 50 µm. In some embodiments, $\Delta w$ may be less than or equal to: 0.01 µm, 0.05 µm, 0.1 µm, 0.5 µm, 1 µm, 5 µm, 10 µm, 20 µm, or 50 µm. In some embodiments, $\Delta w$ may be between 0.1 µm and 10 µm.

In some embodiments, LC-MMI waveguide 1120, and/or any other LC-MMI waveguide discussed herein, may be configured to be tunable by heating and/or cooling. That is, in some embodiments, an LC-MMI waveguide may be configured such that fluid in its core may be heated or cooled to change the refractive index of the LC-MMI waveguide, and to therefore change the propagation of light through the LC-MMI waveguide. In some embodiments, an LC-MMI waveguide may be disposed on a chip, substrate, or other system comprising one or more heating devices or cooling devices, such as a conductive heating device, a radiative heating device, a refrigeration device, and/or a thermoelectric heating and/or cooling device. In some embodiments, LC-MMI waveguide 1120 may be configured such that a fluid in the waveguide may be heated and/or cooled by a temperature range up to the difference between the fluid's melting point and its boiling point. In some embodiments, a fluid in the waveguide may be heated and/or cooled by greater than or equal to: 0.01 degree Celsius, 0.1 degree Celsius, 1 degree Celsius, 10 degree Celsius, or 100 degree Celsius. In some embodiments, a fluid in the waveguide may be heated and/or cooled by less than or equal to: 0.01 degree Celsius, 0.1 degree Celsius, 1 degree Celsius, 10 degree Celsius, or 100 degree Celsius.

In some embodiments, any one or more components of LC-MMI waveguide 1120 may be combined with any one or more components of the other systems, platforms, or devices described herein.

Figure 11C:
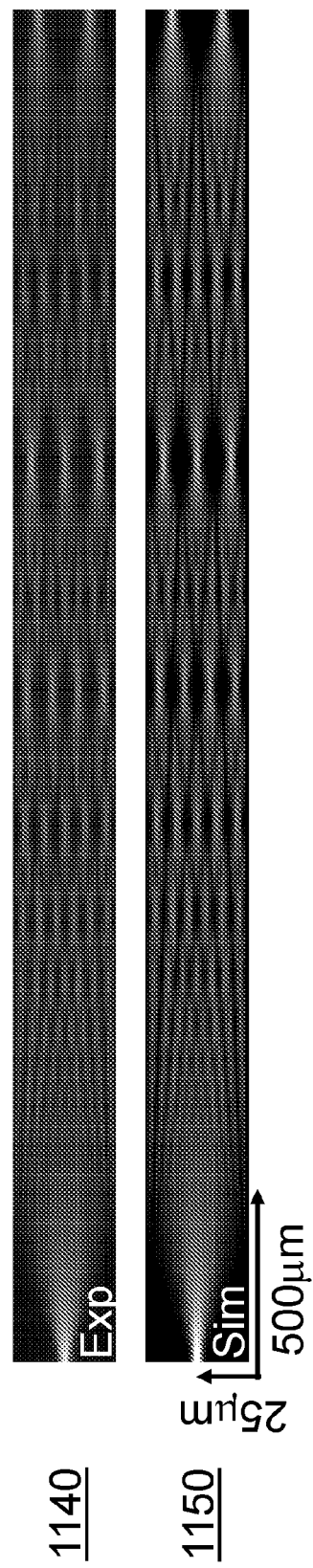
FIG. 11C depicts experimental and simulated multi-spot waveguide patterns for an LC-MMI waveguide, in accordance with some embodiments.

FIG. 11C depicts an experimental (1140) and simulated (1150) multi-spot waveguide pattern for a 50 µm wide liquid-core waveguide.

Figure 11D:
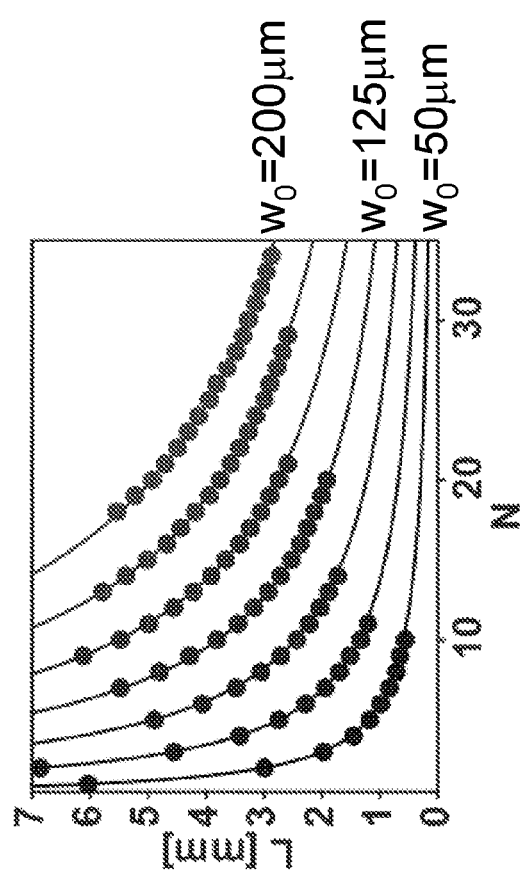
FIG. 11D depicts the relationship of length versus spot number for fabricated LC-MMI waveguides, in accordance with some embodiments.

FIG. 11D depicts the relationship of length versus spot number for seven fabricated LC-MMI waveguides. Each of the seven curves represents a LC-MMI waveguide of a different width, with the darker dots (the lower curves) showing narrower LC-MMI waveguides. The widths of the seven LC-MMI waveguides are 50 µm, 75 µm, 100 µm, 125 µm, 150 µm, 175 µm, and 200 µm, in order from the lower-most curve to the upper-most curve.

Figure 11E:
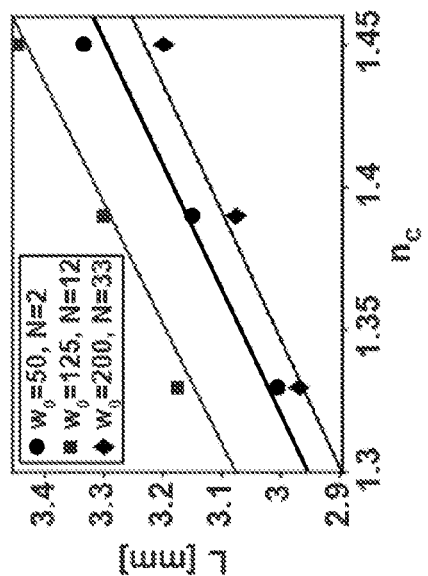
FIG. 11E depicts the relationship of length versus refractive index for fabricated LC-MMI waveguides, in accordance with some embodiments.

FIG. 11E depicts the relationship of length versus refractive index of LC-MMI waveguides, for three different LC-MMI waveguides having respective static widths of 50 µm (N=2), 125 µm (N=12), and 200 µm (N=33). As shown, varying a liquid-core refractive index may be used to dynamically tune a LC-MMI waveguide to shift the length at which a given spot number appears.

Figure 11F:
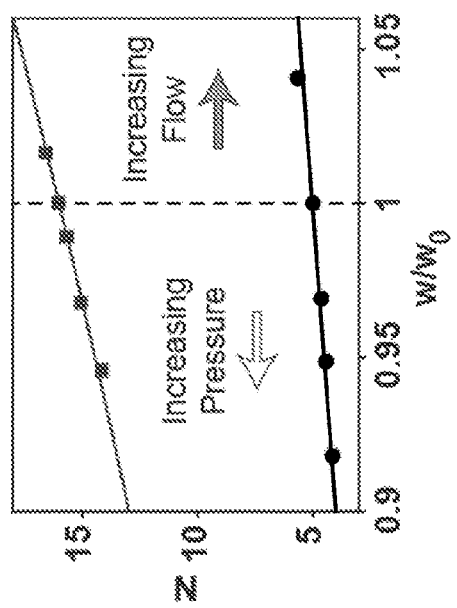
FIG. 11F depicts the relationship of width deformation to spot number for fabricated LC-MMI waveguides, in accordance with some embodiments.
Figure 11G:
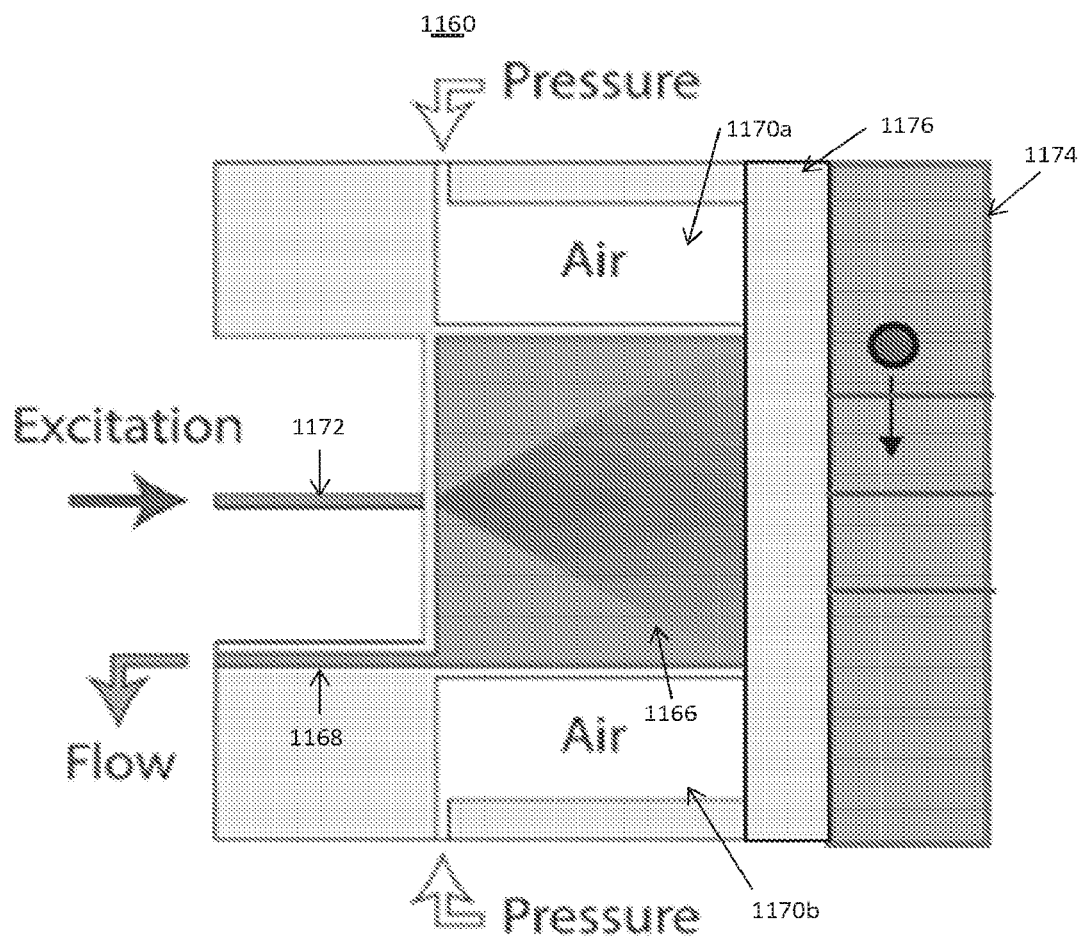
FIG. 11G depicts a multiplex particle detection system comprising a mechanically tunable LC-MMI waveguide, in accordance with some embodiments.

FIG. 11F depicts the relationship of width deformation ($w/w_0$) to spot number N. The lower curve corresponds to a LC-MMI waveguide with $w_0=50$ and the upper curve corresponds to a LC-MMI waveguide with $w_0=100$ µm. In some embodiments, positive pneumatic pressure points may increase to the left, at 20, 40, and 60 PSI, while the liquid flow rate is 1 mL/min. As shown, varying a width of a varying LC-MMI waveguide may be used to dynamically tune the LC-MMI waveguide.

In FIGS. 11D, 11E, and 11F, dots represent data points while the solid lines/curves represent theoretical predictions using eq. (1).

FIG. 11G depicts implementation of (mechanically, fluidically, and/or thermally) tunable LC-MMI waveguide system 1160 for multiplex particle detection with an intersecting liquid-core analyte channel. System 1160 may share any one or more characteristics in common with system 1000 discussed above with respect to FIG. 10A, except that system 1160 may be configured for tuning by use of external pressure or internal flow variations to modify a width of the liquid core of the LC-MMI waveguide in accordance with one or more components, features, and characteristics discussed above with respect to FIG. 11B. As shown, system 1160 may, in some embodiments, comprise LC-MMI waveguide liquid core 1166, fluid inlet/outlet port 1168, pressurization chambers 1170a and 1170b, single-mode excitation waveguide 1172, and liquid-core analyte channel (and/or liquid-core waveguide) 1174 separated from LC-MMI waveguide liquid core 1166 by solid barrier 1176.

In some embodiments, system 1160 and its components may share any one or more characteristics in common with system 1000 and its corresponding components discussed above with respect to FIG. 10A. In some embodiments, system 1160 and its components may share any one or more characteristics in common with a system comprising LC-MMI waveguide 1120 and its corresponding components discussed above with respect to FIG. 11B. In some embodiments, system 1160 may be combined with any one or more components of the other systems, platforms, or devices described herein.

Figure 12:
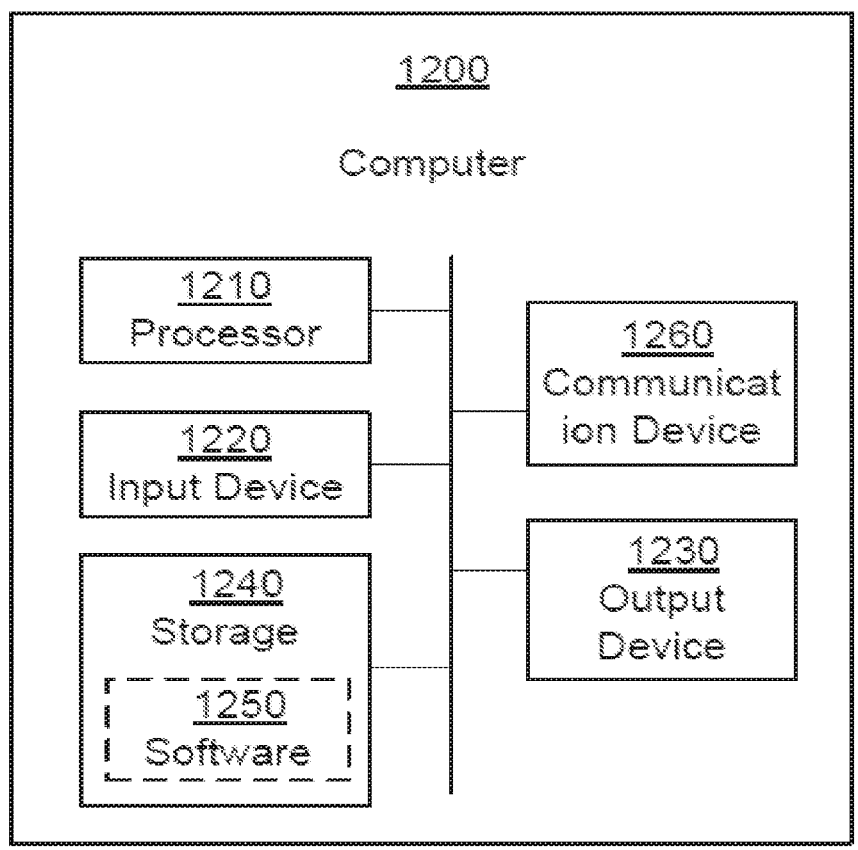
FIG. 12 depicts a computer, in accordance with some embodiments.

FIG. 12 depicts a computer, in accordance with some embodiments. Computer 1200 can be a component of a system for providing integrated multi-layer CPS simulations, such as system 100 and/or any of its subcomponents described above with respect to FIG. 1. In some embodiments, computer 1200 is configured to execute a method for providing, creating, and/or executing integrated multi-layer CPS simulations, such as all or part of methods 200 and/or 500 of FIGS. 2 and 5, respectively. In some embodiments, computer 1200 may be configured to control, monitor, or otherwise send and/or receive electronic signals to and/or from any one or more of the optofluidic analyte detection and/or MMI waveguide systems, devices, and/or platforms described herein. In some embodiments, computer 1200 may be a microprocessing device configured to be disposed on a substrate or chip included in or provided in association with any one or more of the systems, devices, and/or platforms described herein.

Computer 1200 can be a host computer connected to a network. Computer 1200 can be a client computer or a server. As shown in FIG. 12, computer 1200 can be any suitable type of microprocessor-based device, such as a personal computer; workstation; server; or handheld computing device, such as a phone or tablet. The computer can include, for example, one or more of processor 1210, input device 1220, output device 1230, storage 1240, and communication device 1260.

Input device 1220 can be any suitable device that provides input, such as a touch screen or monitor, keyboard, mouse, or voice-recognition device. Output device 1230 can be any suitable device that provides output, such as a touch screen, monitor, printer, disk drive, or speaker.

Storage 1240 can be any suitable device that provides storage, such as an electrical, magnetic, or optical memory, including a RAM, cache, hard drive, CD-ROM drive, tape drive, or removable storage disk. Communication device 1260 can include any suitable device capable of transmitting and receiving signals over a network, such as a network interface chip or card. The components of the computer can be connected in any suitable manner, such as via a physical bus or wirelessly. Storage 1240 can be a non-transitory computer-readable storage medium comprising one or more programs, which, when executed by one or more processors, such as processor 1210, cause the one or more processors to execute methods and/or techniques described herein, such as, but not limited to, all or part of any methods for signal collection, systems control, signal processing, data analysis, data transmission, and/or any determinations described herein, including with respect to any of the optofluidic analyte detection and/or MMI waveguide systems, devices, and/or platforms described herein.

Software 1250, which can be stored in storage 1240 and executed by processor 1210, can include, for example, the programming that embodies the functionality of the present disclosure (e.g., as embodied in the systems, computers, servers, and/or devices as described above). In some embodiments, software 1250 can be implemented and executed on a combination of servers such as application servers and database servers.

Software 1250 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1240, that can contain or store programming for use by or in connection with an instruction execution system, apparatus, or device.

Software 1250 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1200 can implement any operating system suitable for operating on the network. Software 1250 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of any and all patents and publications referred to in this application are hereby incorporated herein by reference.

Various Embodiments

Listed below are various non-limiting enumerated embodiments in accordance with the disclosure herein. Any one or more of the embodiments below may be combined, in whole or in part, with any one or more other embodiments and/or features discussed herein.

Embodiment 1. A system for on-chip analyte detection, comprising:
 a substrate;
 a first analyte channel, disposed on the substrate, configured to receive a first liquid containing first analytes to be detected by the system;
 a second analyte channel, disposed on the substrate, configured to receive a second liquid containing second analytes to be detected by the system;
 a multi-mode interference (MMI) waveguide, disposed on the substrate, that intersects the first analyte channel at a first position and the second analyte channel at a second position, wherein the MMI waveguide is configured to:
  receive input light of a first wavelength and input light of a second wavelength;
  generate a first spot pattern having a first number of spots of light of the first wavelength incident on the first analyte channel;
  generate a second spot pattern having a second number of spots of light of the first wavelength incident on the second analyte channel;
  generate a third spot pattern having a third number of spots of light of the second wavelength incident on the first analyte channel; and generate a fourth spot pattern having a fourth number of spots of light of the second wavelength incident on the second analyte channel;

a detector configured to detect fluorescence bursts from an analyte excited by one of the first spot pattern, the second spot pattern, the third spot pattern, and the fourth spot pattern; and one or more processors configured to:

receive a signal from the detector representing the detected fluorescence bursts;

determine, based on a detected number of bursts in the received signal, whether the signal corresponds to the first channel or to the second channel; and determine, based on the detected number of bursts in the received signal, whether the signal corresponds to the first wavelength of light or to the second wavelength of light.

Embodiment 2. The system for on-chip analyte detection of embodiment 1, wherein the processor is further configured to determine, based on the detected number of bursts in the received signal, an identity of the analyte.

Embodiment 3. The system for on-chip analyte detection of any one of embodiments 1 and 2, wherein the first analyte channel and the second analyte channel are each a waveguide configured to guide light of fluorescence bursts toward the detector.

Embodiment 4. The system for on-chip analyte detection of any one of embodiments 1-3, wherein the detector is disposed on the chip and configured to receive light guided from the analyte channels in a same plane as the analyte channels.

Embodiment 5. The system for on-chip analyte detection of any one of embodiments 1-4, wherein:

the first position is located a first distance from an optical input port of the MMI waveguide such that the light of the first wavelength forms the first number of spots at the first position and the light of the second wavelength forms the third number of spots at the first position; and wherein the second position is located a second distance from the optical input port of the MMI waveguide such that the light of the first wavelength forms the second number of spots at the second position and the light of the second wavelength forms the fourth number of spots at the fourth position.

Embodiment 6. The system for on-chip analyte detection of any one of embodiments 1-5, wherein:

a height of the MMI waveguide is less than or equal to: 0.1 μm, 0.5 μm, 1 μm, 2 μm, or 5 μm; and a width of the MMI waveguide is less than or equal to: 10 μm, 25 μm, 50 μm, 100 μm, or 250 μm.

Embodiment 7. The system for on-chip analyte detection of any one of embodiments 1-6, wherein:

a height of the first analyte channel is less than or equal to: 1 μm, 2 μm, 5 μm, or 10 μm;

and a width of the first analyte channel is less than or equal to: 1 μm, 2 μm, 5 μm, 10 μm, or 20 μm.

Embodiment 8. The system for on-chip analyte detection of any one of embodiments 1-7, wherein:

a width of the substrate is less than or equal to: 2 mm, 5 mm, 1 cm, 2 cm, or 5 cm; and a length of the substrate is less than or equal to: 2 mm, 5 mm, 1 cm, 2 cm, or 5 cm.

Embodiment 9. A system for on-chip analyte detection, comprising:

a substrate;

an analyte channel, disposed on the substrate, configured to receive a liquid containing analytes to be detected by the system;

one or more first waveguides, disposed on the substrate, that intersect the analyte channel, wherein the one or more first waveguides are configured to receive input light of a first wavelength at a first input port and to direct a first multi-spot pattern generated from the input light of the first wavelength onto the intersecting analyte channel;

one or more second waveguides, disposed on the substrate, that intersect the analyte channel, wherein the one or more second waveguides are configured to receive input light of a second wavelength at a second input port and to direct a second multi-spot pattern generated from the input light of the second wavelength onto the intersecting analyte channel; and a demultiplexing multi-mode interference (MMI) waveguide, disposed on the substrate, the demultiplexing MMI waveguide comprising:

a third input port, disposed at a first end of the demultiplexing MMI waveguide, configured to receive input light of the first wavelength and input light of the second wavelength;

a first output port, disposed at a second end of the demultiplexing MMI waveguide opposite the first end, wherein light of the first wavelength is directed to the first input port of the first set of one or more waveguides; and a second output port, disposed at the second end of the demultiplexing MMI waveguide, configured to output a mirror-image of light of the second wavelength, wherein light of the second wavelength is directed to the second input port of the second set of one or more waveguides.

Embodiment 10. The system for on-chip analyte detection of embodiment 9, wherein the third input port is off-center from a center of the demultiplexing MMI waveguide in a first direction perpendicular to the direction of propagation of light in the demultiplexing MMI waveguide.

Embodiment 11. The system for on-chip analyte detection of embodiment 10, wherein:

the first output port is off-center from the center of the demultiplexing MMI waveguide in the first direction, configured to output a self-image of light of the first wavelength; and the second output port is off-center from the center of the demultiplexing MMI waveguide in a second direction opposite the first direction.

Embodiment 12. The system for on-chip analyte detection of any one of embodiments 9-11, wherein the first set of one or more waveguides comprises a first analyte-excitation MMI waveguide configured to generate the first multi-spot pattern by multi-mode interference.

Embodiment 13. The system for on-chip analyte detection of any one of embodiments 9-12, wherein the second set of one or more waveguides comprises a second analyte-excitation MMI waveguide configured to generate the second multi-spot pattern by multi-mode interference.

Embodiment 14. The system for on-chip analyte detection of any one of embodiments 9-13, wherein the first set of one or more waveguides comprises one or more single-mode waveguides.

Embodiment 15. The system for on-chip analyte detection of any one of embodiments 9-14, wherein the second set of one or more waveguides comprises one or more single-mode waveguides.

Embodiment 16. The system for on-chip analyte detection of any one of embodiments 9-15, further comprising a detector configured to detect fluorescence bursts from an analyte excited by one or both of the light of the first wavelength and the light of the second wavelength.

Embodiment 17. The system for on-chip analyte detection of any one of embodiments 9-16, wherein:
 a height of the demultiplexing MMI waveguide is less than or equal to: 0.1 µm, 0.5 µm, 1 µm, 2 µm, or 5 µm; and
 a width of the demultiplexing MMI waveguide is less than or equal to: 10 µm, 25 µm, 50 µm, 100 µm, or 250 µm.

Embodiment 18. The system for on-chip analyte detection of any one of embodiments 10-17, wherein an offset distance by which the third input port is off-center is greater than or equal to: 10%, 25%, or 45% of a width of the demultiplexing MMI waveguide.

Embodiment 19. The system for on-chip analyte detection of any one of embodiments 9-18, wherein:
 a height of the analyte channel is less than or equal to: 1 µm, 2 µm, 5 µm, or 10 µm; and
 a width of the analyte channel is less than or equal to: 1 µm, 2 µm, 5 µm, 10 µm, or 20 µm.

Embodiment 20. The system for on-chip analyte detection of any one of embodiments 9-19, wherein:
 a width of the substrate is less than or equal to: 2 mm, 5 mm, 1 cm, 2 cm, or 5 cm; and
 a length of the substrate is less than or equal to: 2 mm, 5 mm, 1 cm, 2 cm, or 5 cm.

Embodiment 21. A system for on-chip analyte detection, comprising:
 a substrate;
 an analyte channel, disposed on the substrate, configured to receive a liquid containing analytes to be detected by the system; and
 a demultiplexing multi-mode interference (MMI) waveguide, disposed on the substrate, the demultiplexing MMI waveguide comprising:
  a first input port, disposed at a first end of the demultiplexing MMI waveguide, configured to receive input light of a first wavelength and input light of a second wavelength;
  a first output port, disposed at a second end of the demultiplexing MMI waveguide opposite the first end of the demultiplexing MMI waveguide, configured to output light of the first wavelength; and
  a second output port, disposed at the second end of the demultiplexing MMI waveguide, configured to output light of the second wavelength;
 wherein the demultiplexing MMI waveguide is configured to direct output light of the first wavelength and output light of the second wavelength to be incident on the analyte channel to excite one or more analytes in the channel.

Embodiment 22. The system for on-chip analyte detection of embodiment 21, wherein the first input port is off-center from a center of the demultiplexing MMI waveguide in a first direction perpendicular to a direction of propagation of light in the demultiplexing MMI waveguide.

Embodiment 23. The system for on-chip analyte detection of embodiment 22, wherein:
 the first output port is off-center from the center of the demultiplexing MMI waveguide in the first direction and configured to output a self-image of light of the first wavelength; and
 the second output port is off-center from the center of the demultiplexing MMI waveguide in a second direction opposite the first direction and configured to output a mirror-image of light of the second wavelength Embodiment 24. The system for on-chip analyte detection of any one of embodiments 21-23, further comprising a detector configured to detect fluorescence bursts from an analyte excited by one or both of the output light of the first wavelength and the output light of the second wavelength.

Embodiment 25. The system for on-chip analyte detection of any one of embodiments 21-24, further comprising a detector configured to detect fluorescence bursts from an analyte excited by one or both of the light of the first wavelength and the light of the second wavelength.

Embodiment 26. The system for on-chip analyte detection of any one of embodiments 21-25, wherein:
 a height of the demultiplexing MMI waveguide is less than or equal to: 0.1 µm, 0.5 µm, 1 µm, 2 µm, or 5 µm; and
 a width of the demultiplexing MMI waveguide is less than or equal to: 10 µm, 25 µm, 50 µm, 100 µm, or 250 µm.

Embodiment 27. The system for on-chip analyte detection of any one of embodiments 22-26, wherein an offset distance by which the first input port is off-center is greater than or equal to: 10%, 25%, or 45% of a width of the demultiplexing MMI waveguide.

Embodiment 28. The system for on-chip analyte detection of any one of embodiments 21-27, wherein:
 a height of the analyte channel is less than or equal to: 1 µm, 2 µm, 5 µm, or 10 µm; and
 a width of the analyte channel is less than or equal to: 1 µm, 2 µm, 5 µm, 10 µm, or 20 µm.

Embodiment 29. The system for on-chip analyte detection of any one of embodiments 21-28, wherein:
 a width of the substrate is less than or equal to: 2 mm, 5 mm, 1 cm, 2 cm, or 5 cm; and
 a length of the substrate is less than or equal to: 2 mm, 5 mm, 1 cm, 2 cm, or 5 cm.

Embodiment 30. A system for on-chip analyte detection, comprising:
 a substrate;
 an analyte channel, disposed on the substrate, configured to receive a liquid containing analytes to be detected by the system; and
 a multiplexing multi-mode interference (MMI) waveguide, disposed on the substrate, the demultiplexing MMI waveguide comprising:
  a first input port, disposed at a first end of the multiplexing MMI waveguide, configured to receive light of a first wavelength;
  a second input port, disposed at the first end of the multiplexing MMI waveguide, configured to receive light of a second wavelength; and
  an output port, disposed at a second end of the multiplexing MMI waveguide opposite the first end of the multiplexing MMI waveguide, configured to output light of the first wavelength and light of light of the second wavelength;
 wherein the multiplexing MMI waveguide is configured to direct output light of the first wavelength and output light of the second wavelength to be incident on the analyte channel to excite one or more analytes in the channel.

Embodiment 31. The system for on-chip analyte detection of embodiment 30, wherein:
 the first input port is off-center from a center of the multiplexing MMI waveguide in a first direction perpendicular to a direction of propagation of light in the multiplexing MMI waveguide; and
 the second input port is off-center from the center of the multiplexing MMI waveguide in a second direction opposite the first direction.

Embodiment 32. The system for on-chip analyte detection of embodiment 30, wherein:
the output port is off-center from the center of the multiplexing MMI waveguide in the first direction and configured to output a self-image of light of the first wavelength and a mirror-image of light of light of the second wavelength.

Embodiment 33. The system for on-chip analyte detection of embodiment 30, further comprising a detector configured to detect fluorescence bursts from an analyte excited by one or both of output light of the first wavelength and output light of the second wavelength.

Embodiment 34. The system for on-chip analyte detection of embodiment 30, wherein:
a height of the multiplexing MMI waveguide is less than or equal to: 0.1 µm, 0.5 µm, 1 µm, 2 µm, or 5 µm; and
a width of the multiplexing MMI waveguide is less than or equal to: 10 µm, 25 µm, 50 µm, 100 µm, or 250 µm.

Embodiment 35. The system for on-chip analyte detection of embodiment 31, wherein an offset distance by which the first input port is off-center is greater than or equal to: 10%, 25%, or 45% of a width of the multiplexing MMI waveguide.

Embodiment 36. The system for on-chip analyte detection of embodiment 30, wherein:
a height of the analyte channel is less than or equal to: 1 µm, 2 µm, 5 µm, or 10 µm; and
a width of the analyte channel is less than or equal to: 1 µm, 2 µm, 5 µm, 10 µm, or 20 µm.

Embodiment 37. The system for on-chip analyte detection of embodiment 30, wherein:
a width of the substrate is less than or equal to: 2 mm, 5 mm, 1 cm, 2 cm, or 5 cm; and
a length of the substrate is less than or equal to: 2 mm, 5 mm, 1 cm, 2 cm, or 5 cm.

Embodiment 38. A system for on-chip analyte detection, comprising:
a substrate;
a first analyte channel, disposed on the substrate, configured to receive a first solution containing first analytes to be detected by the system; and
an adjustable liquid-core multi-mode interference (LC-MMI) waveguide, disposed on the substrate, that intersects the first analyte channel, the LC-MMI waveguide comprising:
a first liquid-core portion comprising:
a hollow channel configured to receive a first fluid; and
side walls bounding the hollow channel; and
a first opening configured to allow the first fluid to flow into or out of the hollow channel; and
a first optical input port configured to receive input light of a first wavelength;
wherein the LC-MMI waveguide is configured to direct a first multi-spot pattern generated from the input light of the first wavelength onto the intersecting first analyte channel.

Embodiment 39. The system for on-chip analyte detection of embodiment 38, wherein the first liquid-core portion is configured to allow the first fluid to flow out of the hollow channel and to replace the first fluid with a second fluid, the second fluid having a different index of refraction than the first fluid.

Embodiment 40. The system for on-chip analyte detection of any one of embodiments 38 and 39, further comprising a thermal control device, disposed on the substrate, configured to change a temperature of the first fluid, in order to thermally tune the LC-MMI waveguide, by greater than or equal to: 0.01 degree Celsius, 0.1 degree Celsius, 1 degree Celsius, 10 degrees Celsius, or 100 degrees Celsius.

Embodiment 41. The system for on-chip analyte detection of any one of embodiments 38-40, wherein:
the system further comprises a second analyte channel, disposed on the substrate, configured to receive a second solution containing second analytes to be detected by the system; and
the LC-MMI waveguide further comprises a second liquid-core portion configured to direct a second multi-spot pattern generated from the input light of the first wavelength onto the intersecting second analyte channel, and configured to be adjustable independent of the first liquid-core portion.

Embodiment 42. The system for on-chip analyte detection of any one of embodiments 38-41, further comprising a detector configured to detect fluorescence bursts from an analyte excited by first multi-spot pattern.

Embodiment 43. The system for on-chip analyte detection of any one of embodiments 38-42, wherein:
a height of the hollow channel is less than or equal to: 0.1 µm, 0.5 µm, 1 µm, 2 µm, 5 µm, or 10 µm; and
a width of the hollow channel is less than or equal to: 10 µm, 50 µm, 100 µm, 250 µm, or 500 µm.

Embodiment 44. The system for on-chip analyte detection of any one of embodiments 38-43, wherein:
a height of the first analyte channel is less than or equal to: 1 µm, 2 µm, 5 µm, or 10 µm; and
a width of the first analyte channel is less than or equal to: 1 µm, 2 µm, 5 µm, 10 µm, or 20 µm.

Embodiment 45. The system for on-chip analyte detection of any one of embodiments 38-44, wherein:
a width of the substrate is less than or equal to: 2 mm, 5 mm, 1 cm, 2 cm, or 5 cm; and
a length of the substrate is less than or equal to: 2 mm, 5 mm, 1 cm, 2 cm, or 5 cm.

Embodiment 46. The system for on-chip analyte detection of any one of embodiments 38-45, further comprising a pressurization channel separated from the hollow channel by one or more of the side walls, wherein pressurizing the pressurization channel causes one or more of the side walls to deform to adjust a width of the first liquid-core portion.

Embodiment 47. The system for on-chip analyte detection of any one of embodiments 38-46, wherein the system is configured to pressurize the first fluid inside the liquid-core portion to cause one or more of the side walls to deform to adjust a width of the first liquid-core portion.

Embodiment 48. The system for on-chip analyte detection of embodiment 47, wherein adjusting a width of the first liquid-core portion comprises adjusting the width by greater than or equal to: 0.1 µm, 0.5 µm, 1 µm, 5 µm, or 10 µm.

Embodiment 49. The system for on-chip analyte detection of any one of embodiments 47 and 48, wherein adjusting a width of the first liquid-core portion comprises increasing the width to be greater than or equal to: 125% of a static width of the portion, 150% of a static width of the portion, 200% of a static width of the portion, or 500% of a static width of the portion.

Embodiment 50. The system for on-chip analyte detection of any one of embodiments 38-49, wherein adjusting a width of the first liquid-core portion comprises decreasing the width to be less than or equal to: 1% of a static width of the portion, 10% of a static width of the portion, 25% of a static width of the portion, 50% of a static width of the portion, or 75% of a static width of the portion.

What is claimed is:
1. A method for on-chip analyte detection, comprising:
at a system comprising a substrate, an analyte channel disposed on the substrate, and a multi-mode interference (MMI) waveguide disposed on the substrate:

receiving, at a first input port disposed at a first end of the MMI waveguide, from one or more analytes in a liquid in the analyte channel, input light of a first wavelength;

receiving, at a second input port disposed at the first end of the MMI waveguide, from the one or more analytes in the liquid in the analyte channel, input light of a second wavelength; and outputting, at a first output port disposed at a second end of the MMI waveguide opposite the first end, output light of the first wavelength and output light of the second wavelength, wherein:

the first output port is off-center from a center of the MMI waveguide in a first direction;

outputting the output light of the first wavelength at the first output port comprises outputting a self-image of the input light of the first wavelength; and outputting the output light of the second wavelength at the first output port comprises outputting a mirror-image of the input light of the second wavelength.

2. The method of claim 1, wherein:

the first input port is off-center from the center of the MMI waveguide in the first direction perpendicular to a direction of propagation of light in the MMI waveguide; and the second input port is off-center from the center of the MMI waveguide in a second direction opposite the first direction.

3. The method of claim 2, wherein an offset distance by which the first input port is off-center is greater than or equal to 10% of a width of the MMI waveguide.

4. The method of claim 2, wherein an offset distance by which the first input port is off-center is less than or equal to 45% of a width of the MMI waveguide.

5. The method of claim 1, further comprising detecting, by a detector, the output light of the first wavelength and the output light of the second wavelength.

6. The method of claim 5, wherein the detector is in-plane with the analyte channel.

7. The method of claim 1, further comprising illuminating the one or more analytes in the liquid in the analyte channel by an illumination source that is in-plane with the analyte channel.

8. The method of claim 1, wherein:
a height of the MMI waveguide is less than or equal to 5 μm; and
a width of the MMI waveguide is less than or equal to 250 μm.

9. The method of claim 1, wherein:
a height of the analyte channel is less than or equal to 10 μm; and
a width of the analyte channel is less than or equal to 20 μm.

10. The method of claim 1, wherein:
a width of the substrate is less than or equal to 5 cm; and
a length of the substrate is less than or equal to 5 cm.

11. A system for on-chip analyte detection, comprising:
a substrate;
an analyte channel, disposed on the substrate, configured to receive a liquid containing analytes to be detected by the system; and
a multi-mode interference (MMI) waveguide, disposed on the substrate, the MMI waveguide comprising:
a first input port, disposed at a first end of the MMI waveguide proximal to the analyte channel, configured to receive input light of a first wavelength from one or more analytes in the analyte channel;
a second input port, disposed at the first end of the MMI waveguide, configured to receive input light of a second wavelength from the one or more analytes in the analyte channel; and
a first output port, disposed at a second end of the MMI waveguide opposite the first end of the MMI waveguide and distal from the analyte channel, the first output port configured to emit output light of the first wavelength comprising a self-image of the input light of the first wavelength, and further configured to emit output light of the second wavelength comprising a mirror-image of the input light of the second wavelength, wherein the first output port is off-center from a center of the NMI waveguide in a first direction.

\* \* \* \* \*